(12) United States Patent
Kakura

(10) Patent No.: US 8,520,611 B2
(45) Date of Patent: Aug. 27, 2013

(54) COMMUNICATION SYSTEM, AND DEVICE, METHOD, AND PROGRAM USED FOR SAME

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 451 days.

(21) Appl. No.: 12/673,267

(22) PCT Filed: Aug. 4, 2008

(86) PCT No.: PCT/JP2008/063949
§ 371 (c)(1),
(2), (4) Date: Feb. 12, 2010

(87) PCT Pub. No.: WO2009/022565
PCT Pub. Date: Feb. 19, 2009

(65) Prior Publication Data
US 2011/0211538 A1    Sep. 1, 2011

(30) Foreign Application Priority Data

Aug. 10, 2007  (JP) ................................ 2007-209739

(51) Int. Cl.
*H04W 4/00* (2009.01)
(52) U.S. Cl.
USPC ........................................................ 370/329
(58) Field of Classification Search
USPC .......... 370/310–349, 464–540; 709/226–229
See application file for complete search history.

(56) References Cited

U.S. PATENT DOCUMENTS

| | | | |
|---|---|---|---|
| 2002/0181422 A1* | 12/2002 | Parantainen et al. | ......... 370/337 |
| 2004/0151143 A1* | 8/2004 | Abdesselem et al. | ......... 370/336 |
| 2004/0224697 A1* | 11/2004 | Hakkinen et al. | ............. 455/450 |
| 2007/0178930 A1* | 8/2007 | Xiao et al. | ..................... 455/522 |
| 2007/0217361 A1* | 9/2007 | Vannithamby et al. | ........ 370/329 |
| 2007/0220151 A1* | 9/2007 | Li et al. | ........................... 709/226 |
| 2007/0258540 A1* | 11/2007 | Ratasuk et al. | ............... 375/267 |
| 2007/0280166 A1* | 12/2007 | Jung et al. | ...................... 370/331 |
| 2008/0080422 A1* | 4/2008 | Frederiksen et al. | .......... 370/329 |
| 2008/0080423 A1* | 4/2008 | Kolding et al. | ............... 370/329 |
| 2008/0089281 A1* | 4/2008 | Yoon et al. | ..................... 370/329 |
| 2008/0101211 A1* | 5/2008 | Rao | ................................ 370/206 |
| 2008/0159323 A1* | 7/2008 | Rinne et al. | ................... 370/431 |

(Continued)

OTHER PUBLICATIONS

Pi, "An efficient way to transmit multiple acknowledgements in a single-carrier FDMA systems", Mar. 13, 2007, U.S. Appl. No. 60/906,790.*

(Continued)

*Primary Examiner* — Kwang B Yao
*Assistant Examiner* — Juvena Loo
(74) *Attorney, Agent, or Firm* — Young & Thompson

(57) ABSTRACT

A communication system comprises a base station and a mobile station. The base station has resource allocating means for associating basic resources which are M unit resources (M is two or more integer) of a first control channel through which first control information is transmitted with the resources of a second control channel through which second control information is transmitted, allocating at least a part of the basic resources to the first control information, and associating the first control information with the resources of the second control channel corresponding to one of the basic resources allocated to the first control information and first control information transmitting means for transmitting the allocated first control information to the mobile station. The mobile station has second control information transmitting means for receiving the first control information and transmitting second control information by using the resources of the second control channel.

17 Claims, 16 Drawing Sheets

(56) References Cited

U.S. PATENT DOCUMENTS

| | | | |
|---|---|---|---|
| 2008/0212506 A1* | 9/2008 | Lee et al. | 370/310 |
| 2008/0225791 A1* | 9/2008 | Pl et al. | 370/330 |
| 2008/0233964 A1* | 9/2008 | McCoy et al. | 455/450 |
| 2008/0273610 A1* | 11/2008 | Malladi et al. | 375/260 |
| 2009/0262699 A1* | 10/2009 | Wengerter et al. | 370/330 |

OTHER PUBLICATIONS

Kolding, Troels and Frederiksen Frank, "Adaptive Scheme for Lowering Uplink Control Overhead in UTRAN LTE", Oct. 2, 2006, U.S. Appl. No. 60/849,150.*

3GPP TSG RAN WG1 Meeting #49bis RI-072891, "UL ACK/NACK mapping relations,"LG Electronics, Jun. 29, 2007.

3GPP TSG RAN WG1 Meeting #50 R1-073462, "PUCCH allocation for ACK/NACK transmission,"NEC Group, Aug. 24, 2007.

3GPP TSG RAN WG1 Meeting #49bis R1-072696, "E-UTRA DL L1/L2 Invariant Control Channel Design II,"Motorola, Jun. 29, 2007.

3GPP TSG RAN WG1 Meeting #49 R1-072348, "Allocation of UL ACK/NACK index,"LG Electronics, May 11, 2007.

International Search Report PCT/JP2008/063949—Nov. 4, 2008.

B.M. Popovic—Generlized Chirp'Like Polyphase Sequences with Oplimutn Correlation Properlies, IEEE Transactions on information Theory, vol. 38, No. 4, Jul. 1992.

3GPP TSG-RAN WG1 #47 Nov. 6-10, 2006 Riga, Latvia R1-063448.

3GPP TSG RAN WG1 #44bis Athens, Greece, Mar. 27-31, 2006 R1-060925: Comparison of Proposed Uplink Pilot Structures for SC-OFDMA.

3GPP TSG RAN WG1 #48bis Mar. 26-30, 2007, St. Julian, Malta, R1-071293.

* cited by examiner

COMMUNICATION SYSTEM, AND DEVICE, METHOD, AND PROGRAM USED FOR SAME

TECHNICAL FIELD

The present invention relates to a communication system, and an apparatus, a method and a program used for the same, and particularly, to allocation of resources for control channels.

BACKGROUND ART

In an uplink in mobile communications, when a terminal, which is even not transmitting upstream data, receives downstream data, it transmits a positive response/negative response (Acknowledgement/Negative Acknowledgement, which will be designated as "ACK/NACK" hereinbelow) indicating whether information on a downlink was successfully received without error, or information indicating the quality of a channel (Channel Quality Indicator, which will be designated as "CQI" hereinbelow), which indicates the quality of communication in the downlink, using an uplink control channel.

Currently, in LTE (Long Term Evolution) for which standardization is being developed by 3GPP (3rd Generation Partnership Project), the format of a control signal is different in transmitting an ACK/NACK and/or a CQI using an uplink control signal (Physical Uplink Control Channel, which will be designated as PUCCH hereinbelow) between a case in which only an ACK/NACK is transmitted, a case in which only a CQI is transmitted, and both an ACK/NACK and a CQI are transmitted.

FIG. 1 shows examples of (a) a format in transmitting only an ACK/NACK, (b) a format in transmitting only a CQI, and (c) a format in transmitting a CQI and an ACK/NACK. One slot represents 0.5 ms and is composed of seven long blocks (LB's), and one transmission time interval (TTI: Transmission Time Interval) is composed of two slots. The TTI refers to a period of time over a plurality of blocks that are transmitted between a physical layer and a MAC layer at a time. As can be seen from FIG. 1, when a CQI and an ACK/NACK are transmitted at the same time, the number and position of long blocks allocated to the CQI and/or ACK/NACK are different as compared with a case in which only an ACK/NACK is transmitted as control information or a case in which only a CQI is transmitted as control information.

FIG. 2 shows an example of a slot configuration in LTE. A PUCCH is multiplexed on both sides of a system bandwidth. Although the PUCCH portion includes a reference signal (RS) for demodulating the PUCCH as shown in FIG. 1, it is omitted from the illustration in FIG. 2.

The PUCCH and reference signal for demodulating it employs a CAZAC (Constant Amplitude Zero Auto-Correlation) sequence. The CAZAC sequence is characterized in having a constant amplitude and an autocorrelation value of zero at a non-zero phase difference in the time domain and frequency domain. An example of the CAZAC sequence is a Zadoff-Chu sequence given as follows (see Non-patent Document 1):

$$c_k(n) = \quad \text{[EQ. 1]}$$

-continued $$\begin{cases} \exp\left[\frac{j2\pi k}{L}\left(\frac{n^2}{2}+n\right)\right] & \text{in case that a sequence length } L \text{ is an even number} \\ \exp\left[\frac{j2\pi k}{L}\left(n\frac{n+1}{2}+n\right)\right] & \text{in case that a sequence length } L \text{ is an odd number} \end{cases}$$

$n: 0, 1, \ldots,$ $L-1 k$: an index of a sequence ($k$ and $L$ are integers that are *coprime*.)

User multiplexing methods for the PUCCH include Frequency Division Multiplexing (FDM) and Code Division Multiplexing (CDM) (see Non-patent Document 2). In CDM, each user uses the same CAZAC sequence but with a cyclic shift specific to the user (see Non-patent Document 3). This ensures orthogonality between users. FIG. 3 is a diagram for explaining the cyclic shift. Representing a unit amount of the cyclic shift as ΔT ((long block length)/6 in the drawing), a cyclically shifted sequence i (i=1, 2, 3, 4, 5, 6) is created by shifting a basic sequence with a tail of ΔT×(i−1) brought to the head. To keep inter-user orthogonality, ΔT should be larger than a latest path in a propagation channel.

Since the ACK/NACK has a small amount of information to be transmitted (basically, one bit), it is possible to further apply block spread along a time axis to thereby increase the number of multiplexed users (see Non-patent Document 4). FIG. 4 is a diagram showing an example of block spread. Since in the drawing, three long blocks are used for a reference signal and four long blocks are used for an ACK/NACK, block spread is applied to the reference signal with an user-specific orthogonalizing code having a code length of three and to the ACK/NACK with the code having a code length of four. The number of multiplexable users is equal to the code length, and in this case, it is three at maximum from the length of the sequence for the reference signal having a shorter code length. Therefore, assuming that the number of multiplexable users is six using the cyclic shift, eighteen users, three times the six users, can be multiplexed within the same frequency.

For a user to whom a resource for downstream data is to be allocated using a downlink L1/L2 control signal, a PUCCH resource for transmitting an ACK/NACK is associated one to one with the index of a control channel for use in scheduling, and no signaling is performed by agreement.

FIG. 5 shows an example of the format of a downlink frame. First two OFDM symbols represent L1/L2 control signals, which are composed of Downlink grants (each designated as DL grant in the drawing) containing information on allocation of a downlink shared channel, and Uplink grants (each designated as UL grant in the drawing) containing information on allocation of an uplink shared channel. The Downlink grants #0-#N in FIG. 5 contain information on resources allocated to DL Data #0-#N and identifiers of users to receive the data, respectively.

FIG. 6 shows an example of association between Downlink grants and PUCCH resources. It should be noted that while PUCCH resources are currently given no indices, the following description will be made as if they were given indices.

A resource for transmitting a Downlink grant is composed of CCE's (Control Channel Elements), and each CCE constitutes a unit resource. The index of a CCE is associated one to one with the index of a PUCCH resource. While a Downlink grant uses at least one CCE or more, a PUCCH resource associated with the index of one of the CCE's used for one Downlink grant is a resource allocated to a user for that Downlink grant.

FIG. 6 shows a case in which a resource for transmitting a Downlink grant is composed of one CCE, and each CCE is associated one to one with a PUCCH resource. Therefore, a user for a Downlink grant #0 uses a PUCCH resource associated with a CCE (index #0) of the Downlink grant #0 to transmit an ACK/NACK for data allocated by the Downlink grant #0.

This eliminates the need for use of signaling in allocation of PUCCH resources, and it is possible to reduce the signaling overhead.

Non-patent Document 1: B. M. Popovic, "Generalized Chirp-Like Polyphase Sequences with Optimum Correlation Properties," IEEE Transactions on information Theory, Vol. 38, No. 4, pp. 1406-1409, July 1992.

Non-patent Document 2: 3GPP R1-063448, Qualcomm, "Structure and Link Analysis UL Control Signaling," November 2006.

Non-patent Document 3: 3GPP R1-060925, Texas Instruments, "Comparison of Proposed Uplink Pilot Structures For SC-OFDMA," March 2006.

Non-patent Document 4: 3GPP R1-071293, Qualcomm Europe, "Link Analysis and Multiplexing Capability for UL ACK," March 2007.

DISCLOSURE OF THE INVENTION

Problems to be Solved by the Invention

However, Downlink grants, Uplink grants, etc. in an L1/L2 control signal have a varying number of CCE's constituting the same depending upon the condition of the propagation channel or among users, so that it is difficult to efficiently associate a Downlink grant of a variable size with a PUCCH resource. Specifically, when the size of the Downlink grant increases up to two or four CCE's, and the index of each CCE is associated with each PUCCH resource as shown in FIG. 6, a PUCCH resource associated with the index of one of the CCE's constituting a Downlink grant is allocated to a user, and many unused PUCCH resources may occur.

For example, FIG. 7 shows Downlink grants each having a size of two CCE's, wherein a PUCCH resource associated with the smallest one of indices of CCE's constituting a Downlink grant is allocated to a user, which prevents PUCCH's having odd indices from being efficiently used.

Since a user who transmits upstream data does not use a PUCCH in transmitting an ACK/NACK signal but transmits it along with the data through a shared channel (PUSCH: Physical Uplink Shared Channel), a PUCCH resource associated with CCE's constituting a Downlink grant for the user is possibly inefficiently used. A user who transmits a CQI may also transmit an ACK/NACK using a PUCCH allocated for transmitting the CQI, which means that there is a possibility that the number of inefficiently used PUCCH's is further increased.

The present invention has been made in view of the aforementioned problem, and its object is to provide a communication system, and an apparatus, a method and a program used for the same capable of efficiently using resources for control channels.

Means to Solve the Problem

The present invention for solving the above-mentioned problem is a communication system in comprising: a base station having a resource allocating means for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information, and a first control information transmitting means for transmitting said allocated first control information to a mobile station; and a mobile station having a second control information transmitting means for receiving said first control information, and transmitting said second control information using the resource in the second control channel associated with said first control information.

The present invention for solving the above-mentioned problem is a base station comprising: a resource allocating means for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information; and a first control information transmitting means for transmitting said allocated first control information to said mobile station.

The present invention for solving the above-mentioned problem is a mobile station for receiving first control information, for which M unit resources (M is an integer equal to or greater than two) in a first control channel through which the first control information is transmitted from a base station are defined as a basic resource, and in which a resource in a second control channel through which second control information is transmitted is associated with said basic resource, said first control information being transmitted using at least part of said basic resource, and transmitting second control information using a resource in the second control channel associated with received first control information, said mobile station comprising: association relationship information that is information on the association relationship between said basic resource or unit resources constituting said basic resource and a resource in the second control channel through which the second control information is transmitted; and a control information transmitting means for deciding a resource in the second control channel associated with said received first control information based on the information for the basic resource for said received first control information or unit resources constituting said basic resource, and said association relationship information.

The present invention for solving the above-mentioned problem is a program for causing a base station to execute: resource allocating processing for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information; and first control information transmitting processing for transmitting said allocated first control information to said mobile station.

The present invention for solving the above-mentioned problem is a program for a mobile station for receiving first control information, for which M unit resources (M is an integer equal to or greater than two) in a first control channel through which the first control information is transmitted from a base station are defined as a basic resource, and in which a resource in a second control channel through which second control information is transmitted is associated with said basic resource, said first control information being transmitted using at least part of said basic resource, and transmitting second control information using a resource in the second control channel associated with received first control information, said program causing said mobile station to execute: control information transmitting processing for deciding a resource in the second control channel associated with said received first control information based on association relationship information that is information on the association relationship between said basic resource or unit resources constituting said basic resource and a resource in the second control channel through which the second control information is transmitted, and the information for the basic resource for said received first control information or unit resources constituting said basic resource.

The present invention for solving the above-mentioned problem is a communication method wherein: a first wireless station transmits first control information to a second wireless station using at least one unit resource in a first control channel; and a second wireless station transmits second control information using a resource in a second control channel associated with a resource consisting of M unit resources (M is an integer equal to or greater than two) in said first control channel.

The present invention for solving the above-mentioned problem is a communication method for a communication system comprising a mobile station and a base station, wherein the base station defines M unit resources (M is an integer equal to or greater than two) in a first control channel through which first control information is transmitted as a basic resource, associates a resource in a second control channel through which second control information is transmitted from the mobile station with said basic resource, allocates at least part of said basic resource to said first control information, and associates the first control information to which at least part of said basic resource is allocated with a resource in the second control channel associated with one of the basic resources allocated to said first control information.

The present invention for solving the above-mentioned problem is a communication method in a communication system comprising a mobile station and a base station, in which M unit resources (M is an integer equal to or greater than two) in a first control channel through which first control information is transmitted from said base station are defined as a basic resource, and in which a resource in a second control channel through which second control information is transmitted is associated with said basic resource for receiving first control information transmitted using at least part of said basic resource, and transmitting, by the mobile station, second control information using a resource in the second control channel associated with the received first control information, wherein: the mobile station decides a resource in the second control channel associated with said received first control information based on association relationship information that is information on the association relationship between said basic resource or unit resources constituting said basic resource and a resource in the second control channel through which the second control information is transmitted, and the information for the basic resource for the received first control information or unit resources constituting said basic resource.

The present invention for solving the above-mentioned problem is a communication system comprising: a base station having a resource allocating means for providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information, and a first control information transmitting means for transmitting said allocated first control information to said mobile station; and a mobile station having a second control information transmitting means for receiving said first control information, and transmitting said second control information using the resource in the second control channel associated with said first control information.

The present invention for solving the above-mentioned problem is a base station comprising: a resource allocating means for providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information; and a first control information transmitting means for transmitting said allocated first control information to said mobile station.

The present invention for solving the above-mentioned problem is a mobile station for receiving first control information for which a plurality of basic resources corresponding to a plurality of kinds of sizes of first control information are provided, and in which a resource in a second control channel through which second control information is transmitted is associated with each basic resource, said first control information being transmitted from a base station using at least part of said basic resource, and transmitting second control information using a resource in the second control channel associated with the received first control information, said mobile station comprising: association relationship information that is information on the association relationship between said basic resource and a resource in the second control channel through which the second control information is transmitted; and a control information transmitting means for deciding a resource in the second control channel associated with said received first control information based on the information for the basic resource for said received first control information, and said association relationship information.

The present invention for solving the above-mentioned problem is a communication method in a communication system comprising a base station and a mobile station, wherein: the base station provides a plurality of basic resources corresponding to a plurality of kinds of sizes of first control information, associates a resource in a second control channel through which second control information is transmitted with each basic resource, allocates at least part of said basic resource to said first control information, and associates the first control information to which at least part of said basic resource is allocated with a resource in the second control channel associated with one of the basic resources allocated to said first control information, and transmits said allocated first control information to said mobile station; and the mobile station receives said first control information, and transmits said second control information using the resource in the second control channel associated with said first control information.

The present invention for solving the above-mentioned problem is a communication method for a base station in a communication system comprising a base station and a mobile station, comprising: providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information; and transmitting said allocated first control information to said mobile station.

The present invention for solving the above-mentioned problem is a communication method for a mobile station for receiving first control information for which a plurality of basic resources corresponding to a plurality of kinds of sizes of first control information are provided, and in which a resource in a second control channel through which second control information is transmitted is associated with each basic resource, said first control information being transmitted from a base station using at least part of said basic resource, and transmitting second control information using a resource in the second control channel associated with the received first control information, said method comprising: deciding a resource in the second control channel associated with said received first control information based on association relationship information that is information on the association relationship between said basic resource and a resource in the second control channel through which the second control information is transmitted, and the information for said basic resource for said received first control information.

Effects of the Invention

According to the present invention, efficient use of resources in a second control channel can be achieved.

EXPLANATION OF SYMBOLS

Figure 1:
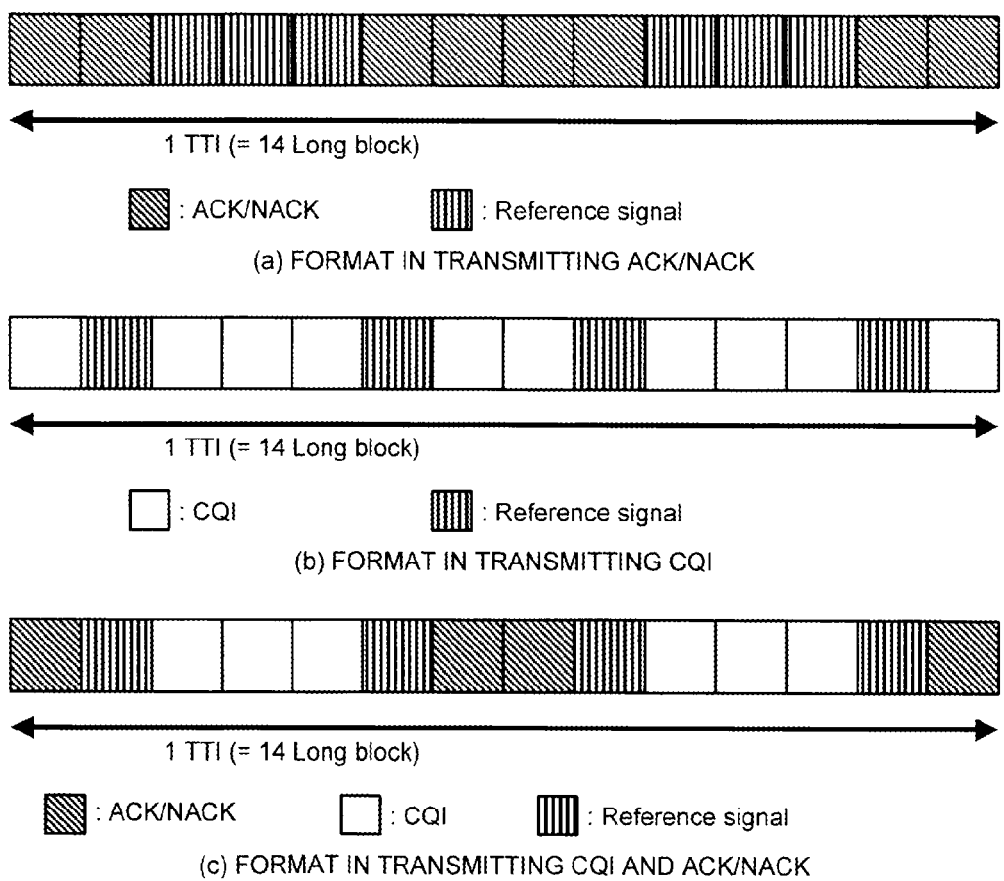
FIG. 1 shows examples of (a) a format in transmitting only an ACK/NACK, (b) a format in transmitting only a CQI, and (c) a format in transmitting a CQI and an ACK/NACK.

10 Base station
20 Mobile station
101 Wireless communication control section
102 PUSCH reproducing section
103 PUCCH reproducing section
104 CQI measuring section
105 Control section
106 Scheduler
107 PDCCH producing section
108 PDSCH producing section
109 Reference signal generating section
201 Wireless communication section
202 PDCCH reproducing section
203 PDSCH reproducing section
204 Control section
205 PUSCH producing section
206 PUCCH producing section
207 CAZAC sequence spreading section
208 CAZAC sequence generating section
209 Discrete Fourier Transform section
210 Signal choosing section

BEST MODES FOR CARRYING OUT THE INVENTION

Several embodiments of the present invention will be described herein below.

The present invention is characterized in defining M unit resources (M is an integer equal to or greater than two) in a first control channel through which first control information is transmitted as a basic resource, associating a resource in a second control channel through which second control information is transmitted with the basic resource, allocating at least part of the basic resource to the first control information, and associating the first control information to which at least part of the basic resource is allocated with a resource in the second control channel associated with one of the basic resources allocated to the first control information, so that the first control information is linked with a resource in the second control channel.

Here, the basic resource composed of M unit resources (M is an integer equal to or greater than two) refers to a conceptual resource for associating the first control information with a resource in the second control channel. Therefore, resources in the first control channel may be divided into basic resources each composed of M equal unit resources (M is an integer equal to or greater than two), or alternatively, may be divided into a plurality of basic resources each composed of a different number M of resources.

Figure 8:
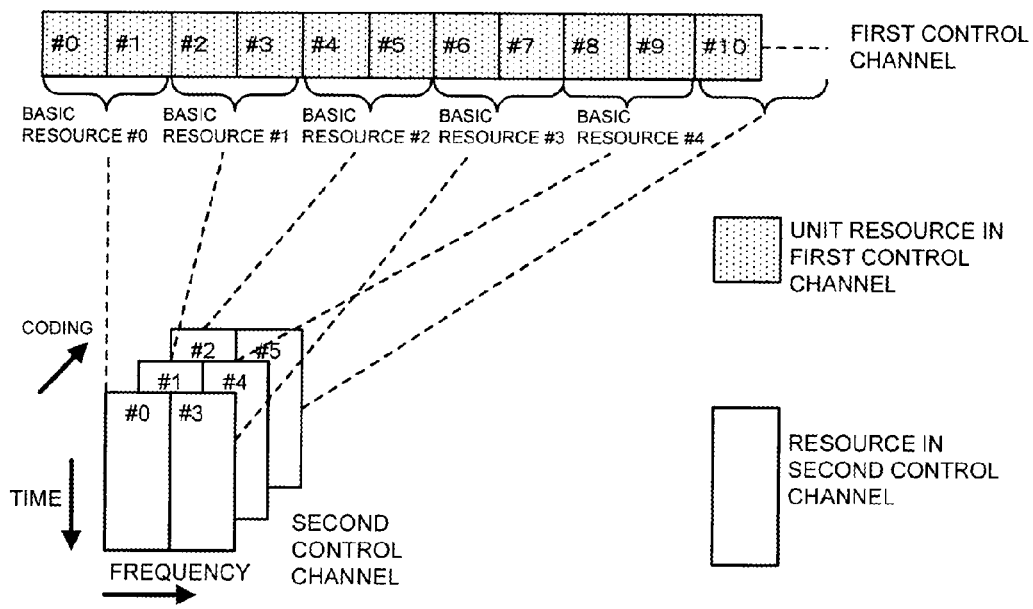
FIG. 8 is a diagram for explaining the present invention.

FIG. 8 is a diagram for explaining the overview of the present invention. It should be noted that in FIG. 8, indices are given to unit resources in a first control channel and those in a second control channel for convenience' sake.

The example in FIG. 8 shows, for facilitating understanding, a case in which basic resources in the first control channel are each composed of two unit resources (a case in which M=2), wherein these basic resources are associated with a resource in the second control channel. Specifically, a basic resource #0 composed of a unit resource with index #0 and a unit resource with index #1 in the first control channel is associated with a resource with index #0 in the second control channel. A basic resource #1 composed of a unit resource with index #2 and a unit resource with index #3 in the first control channel is associated with a resource with index #1 in the second control channel. A basic resource #2 composed of a unit resource with index #4 and a unit resource with index #5 in the first control channel is associated with a resource with index #2 in the second control channel. A basic resource #3 composed of a unit resource with index #6 and a unit resource with index #7 in the first control channel is associated with a resource with index #3 in the second control channel. A basic resource #4 composed of a unit resource with index #8 and a unit resource with index #9 in the first control channel is associated with a resource with index #4 in the second control channel. Thereafter, a basic resource composed of two unit resources in the first control channel is similarly associated with a resource in the second control channel.

Figure 9:
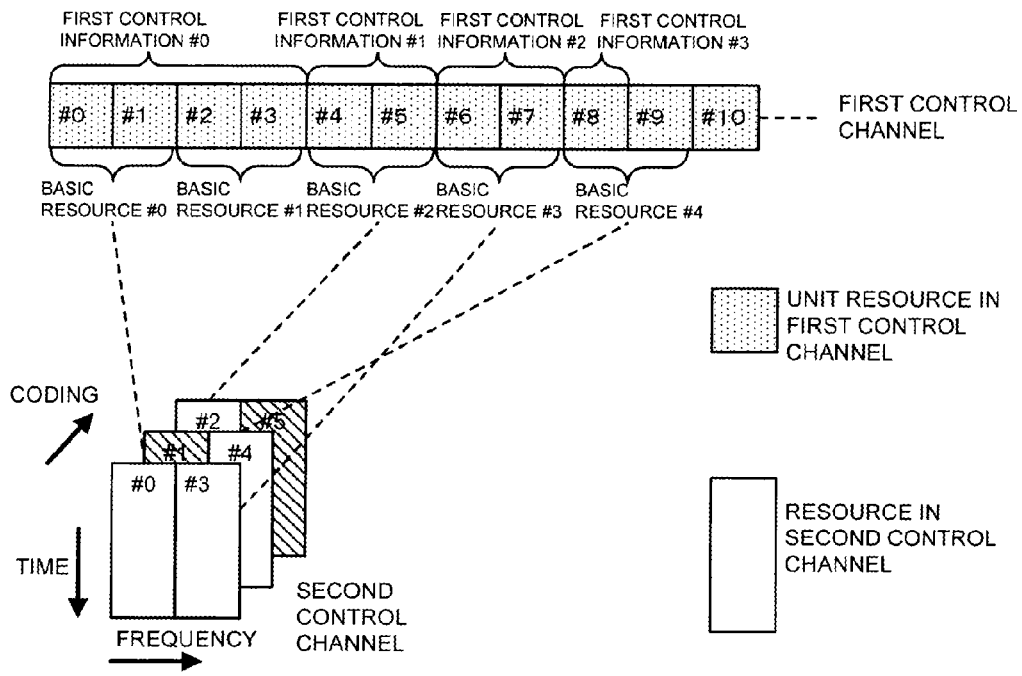
FIG. 9 is a diagram for explaining the present invention.

As shown in FIG. 8, in a case that a basic resource composed of two unit resources in the first control channel is associated with a resource in the second control channel, consider a case as shown in FIG. 9 in which first control information #0 having a size of four unit resources, first control information #1, #2 each having a size of two unit resources, and first control information #3 having a size of one unit resource are transmitted from a first wireless station to a second wireless station, which in turn transmits second control information using resources corresponding to the first control information.

The first wireless station allocates the first control information to at least part of the basic resource in the first control channel. For example, since the first control information #0 requires four unit resources, basic resources #0 and #1 in the first control channel are allocated to the first control information #0. Then, a resource in the second control channel associated with either the basic resource #0 or #1 is associated with the first control information #0. In the present example, the resource with index #0 in the second control channel associated with the basic resource #0 is associated with the first control information #0.

Likewise, the first wireless station allocates the first control information #1 to a basic resource #2 in the first control channel. It then associates a resource with index #2 in the second control channel associated with the basic resource #2 with the first control information #1.

Likewise, the first wireless station allocates the first control information #2 to a basic resource #3 in the first control channel. It then associates a resource with index #3 in the second control channel associated with the basic resource #3 with the first control information #2.

Moreover, since the first control information #3 requires one unit resource, the first control information #3 is allocated to a unit resource with index #8, which is part of the basic resource #4. Then, a resource with index #4 in the second control channel associated with the basic resource #4 is associated with the first control information #3.

As such, the number of unused resources in the second control channel is reduced as compared with an operation involving associating a resource in the second control channel with each unit resource in the first control channel. This is illustrated in the example in FIG. 9, wherein the resource with index #1 in the second control channel and the resource with index #5 in the second control channel are not associated with any first control information, so that they can be allocated to another second wireless station that does not transmit the second control information using the second control channel, thus achieving efficient use of resources in the second control channel.

Moreover, since according to the present invention, resources in the second control channel are disposed densely in the frequency bandwidth as shown in FIG. 9, there is provided another effect that a vacant frequency bandwidth can be allocated to other channels without creating useless frequency bandwidths.

Further, for those of unit resources in the first control channel to which no first control information is allocated, they can be allocated to other second wireless stations that do not transmit the second control information using the second control channel associated with basic resources, thus achieving effective use of resources in the first control channel. For example, in the example shown in FIG. 9, a unit resource with index #9 in the first control channel can be allocated to another second wireless station that does not transmit the second control information using the second control channel associated with the basic resource.

A method of identifying a resource in the second control channel by a second wireless station may be configured so that information on an association relationship between the first control information and a resource in the second control channel is shared between the first and second wireless stations. For example, in the example of FIG. 9, representing the smallest index of unit resources used for transmitting the first control information as X and the index of a resource in the second control channel as Y, Y can be determined from a quotient of X/2. By storing the information on the association relationship in the second wireless station beforehand, the second wireless station can know an index of a resource in the second control channel for transmitting second control information by calculating a quotient of the smallest index of a unit resource constituting the received first control information divided by two. It should be noted that the aforementioned example is merely illustrative and other methods may apply.

Moreover, in a case that the present invention is applied to 3GPP, specific examples of the first wireless station, second wireless station, first control channel, second control channel, unit resource in the first control channel, first control information, and second control information may be represented by the first wireless station corresponding to a base station (also referred to as Node B), second wireless station corresponding to a mobile station (also referred to as UE), first control channel corresponding to a PDCCH (Physical Downlink Control Channel), unit resource in the first control channel corresponding to a CCE (Control Channel Element), first control information corresponding to a Downlink grant, second control channel corresponding to a PUCCH (Physical Uplink Control Channel), and second control information corresponding to ACK (Acknowledgement)/NACK (Negative Acknowledgement) for data through the PDSCH (Physical Downlink Shared Channel) specified by a Downlink grant.

Then, the operation is as follows. It is assumed that information such as the number of CCE's constituting a basic resource and an association relationship between basic resources and PUCCH resources is shared between a base station and a user terminal The base station notifies a user who allocated downstream data to the PDSCH of allocation information in a Downlink grant (which will be sometimes referred to as DL grant hereinbelow) in a downstream L1/L2 control signal. The DL grant has a format having varying sizes consisting of integer multiples of a CCE, which is a unit resource for the PDCCH. Basic resources composed of M CCE's in the PDCCH are associated with the indices of the PUCCH resources.

The base station allocates a DL grant to a user terminal that transmits only an ACK/NACK in response to a data signal allocated by the DL grant, preferentially to a user terminal to which the PUCCH to be used is notified by signaling. The method of allocation is as described above, and allocates a DL grant to at least part of the basic resource of M CCE's. Then, the DL grant is associated with a PUCCH resource associated with the basic resource to which the DL grant is allocated.

When the user terminal transmits only an ACK/NACK in response to data allocated by the DL grant, it decides a PUCCH resource from the index of the CCE's of the received DL grant based on information on the association relationship, and uses the resource.

Now a specific embodiment will be described in detail. It should be noted that the following description addresses a case in which the present invention is applied to 3GPP.

Figure 10:
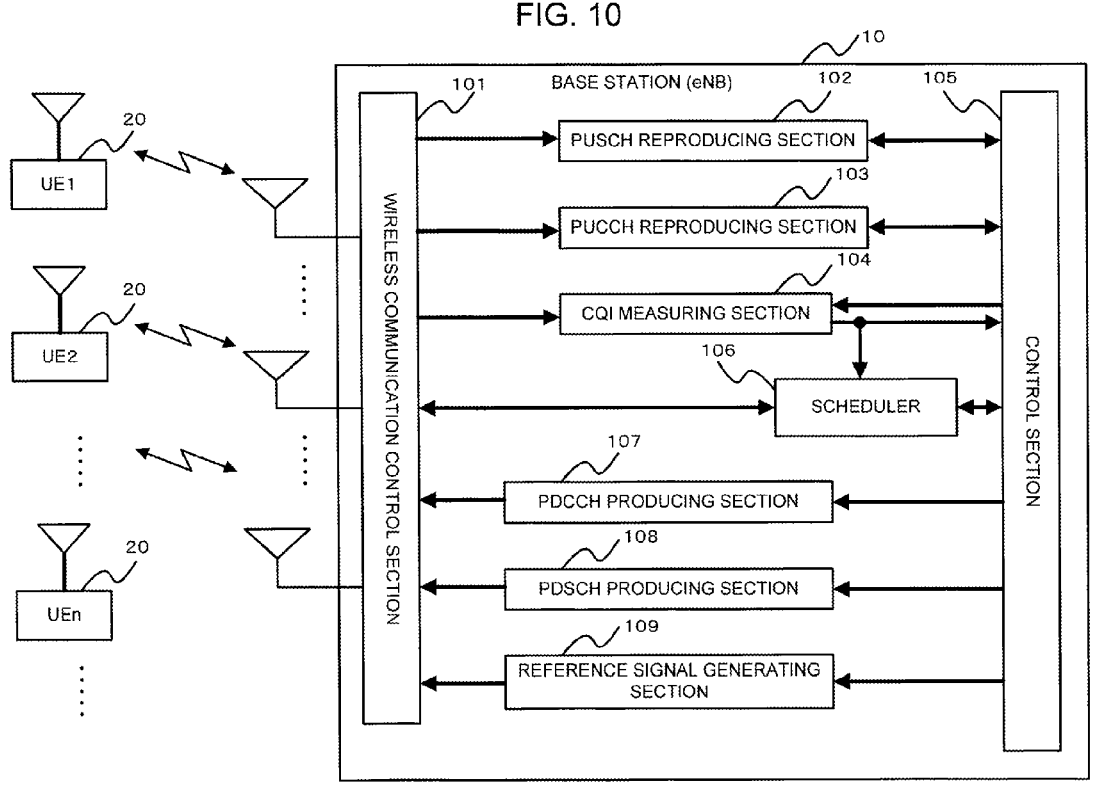
FIG. 10 is a block diagram showing a main configuration of a base station according to an embodiment of the present invention.

FIG. 10 is a block diagram showing a main configuration of a base station according to the embodiment of the present invention. In FIG. 10, the base station 10 is assumed to accommodate a plurality of mobile stations 20 (UE1, UE2 . . . ).

Figure 2:
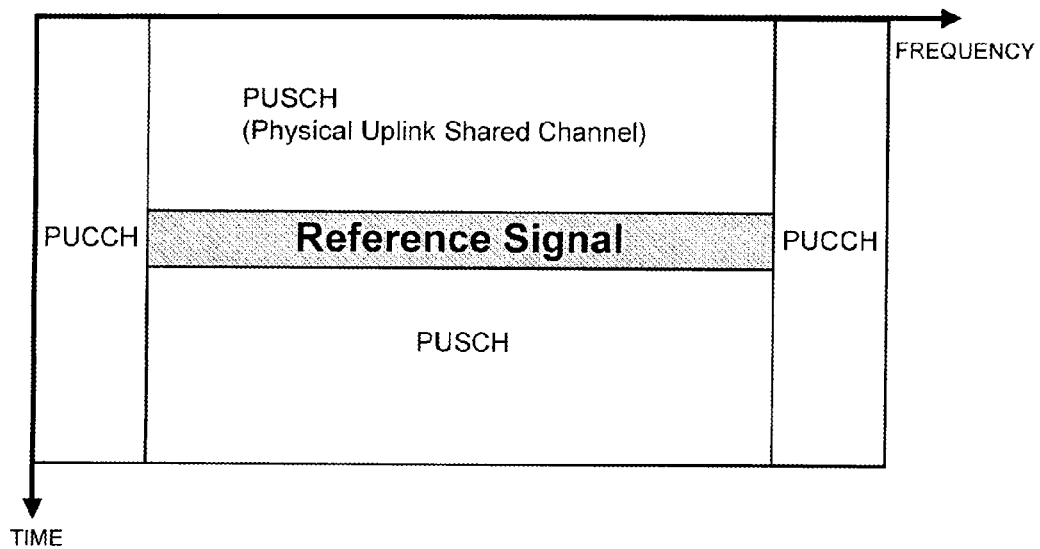
FIG. 2 shows an example of a slot configuration in LTE.
Figure 3:
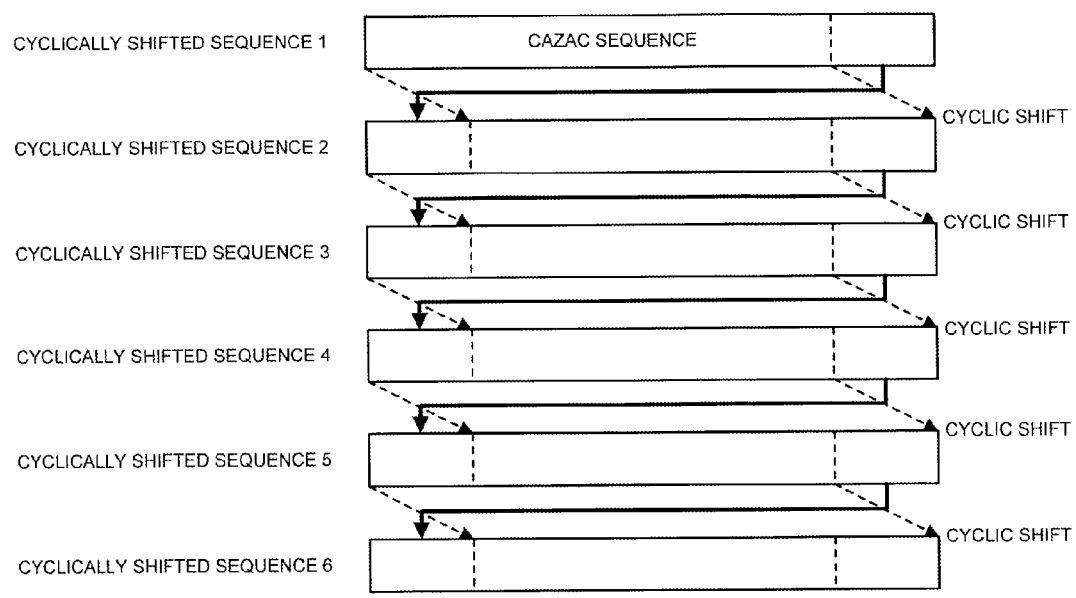
FIG. 3 is a diagram for explaining a cyclic shift.
Figure 4:
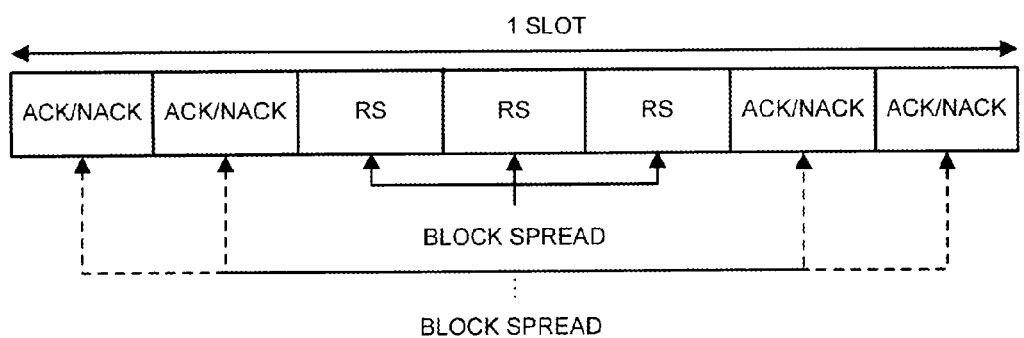
FIG. 4 is a diagram showing an example of block spread.
Figure 5:
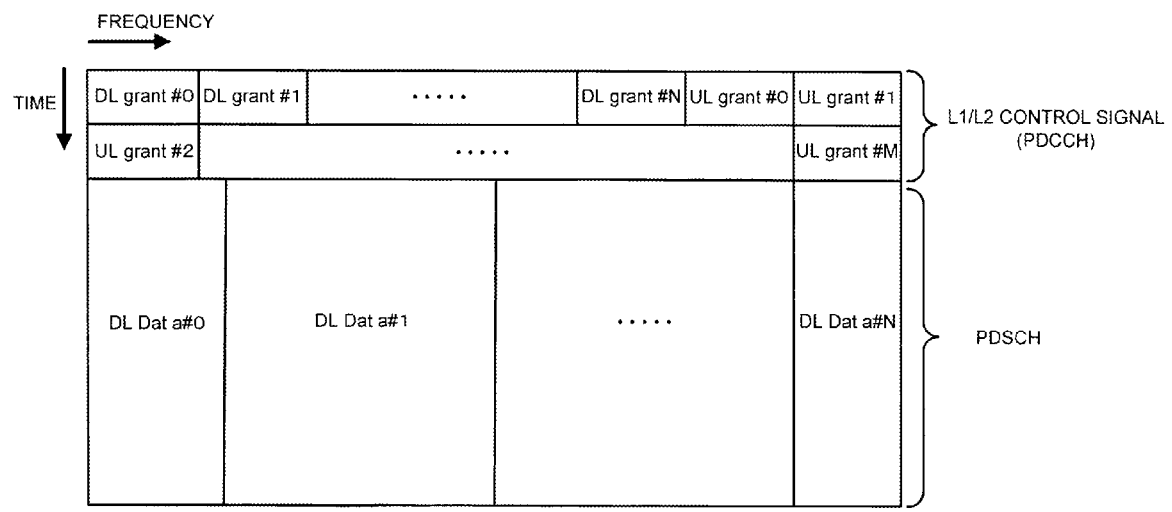
FIG. 5 shows an example of a format of a downlink frame.
Figure 6:
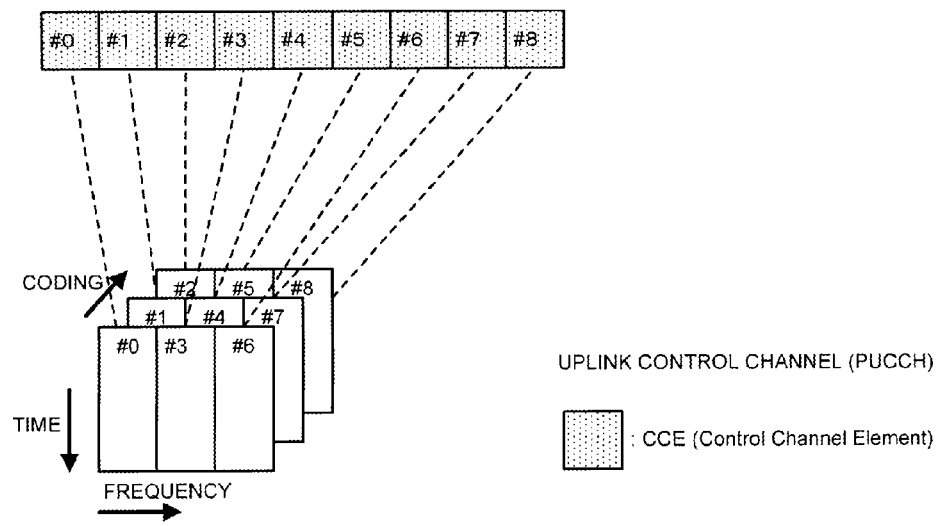
FIG. 6 shows an example of association between Downlink grants and PUCCH resources.
Figure 7:
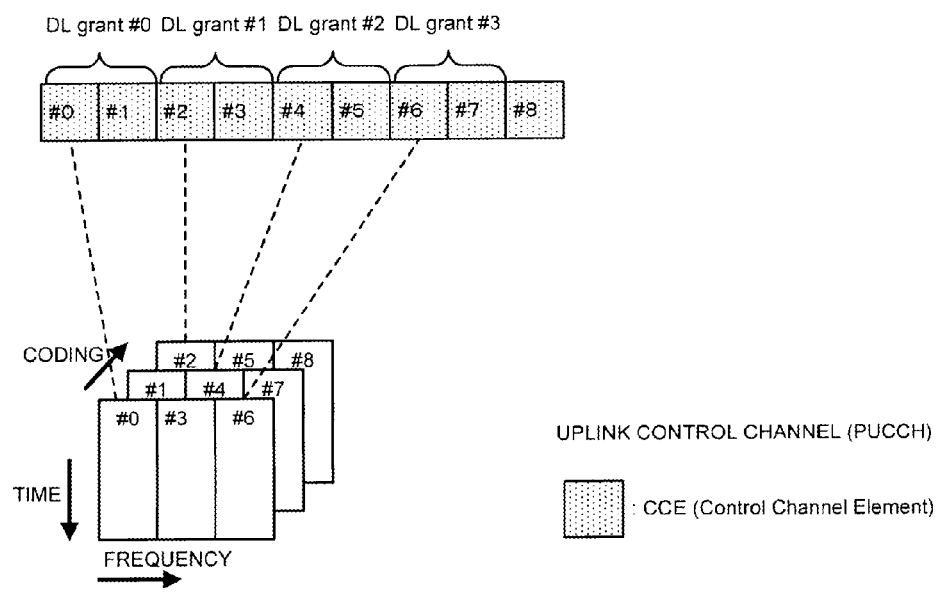
FIG. 7 is a diagram for explaining a conventional technique.

In FIG. 10, a wireless communication control section 101 controls communication with a plurality of mobile stations UE according to a given frequency/time multiplexing configuration, as shown in FIG. 2, for example. For example, the wireless communication control section 101 separates multiplexed signals received from a plurality of mobile stations UE to output them to a PUSCH reproducing section 102, a PUCCH reproducing section 103 and a CQI measuring section 104; it also multiplexes several kinds of transmitted signals from a PDCCH (Physical Downlink Control Channel) producing section 107, a PDSCH producing section 108 and a reference signal generating section 109 according to the given frequency/time multiplexing configuration to transmit the resulting signals to a plurality of mobile stations.

The CQI measuring section 104 receives reference signals from the mobile stations to measure quality of the uplink propagation channel and output it to the control section 105 and scheduler 106. The scheduler 106 uses the measured quality of the uplink propagation channel for the mobile stations to perform channel-dependent frequency scheduling under control of the control section 105.

The scheduler 106 outputs downlink PDSCH allocation information (Downlink grant) and uplink PUSCH allocation information (Uplink grant) to the PDCCH producing section 107 and PDSCH producing section 108 via the control section 105, and the Downlink grant is transmitted to each mobile station by the PDCCH producing section 107 and wireless communication control section 101 as a downlink control signal, and downstream data corresponding to the Downlink grant is transmitted to each mobile station by the PDSCH producing section 108 and wireless communication control section 101.

When there is PUCCH allocation information for periodical CQI reporting, the control section 105 also outputs it to the PDSCH producing section 108, and the PUCCH allocation information for CQI reporting is transmitted to each mobile station by the PDSCH producing section 108 and wireless communication control section 101 as part of PDSCH. The operation of the control section 105 will be discussed in detail later.

Figure 11:
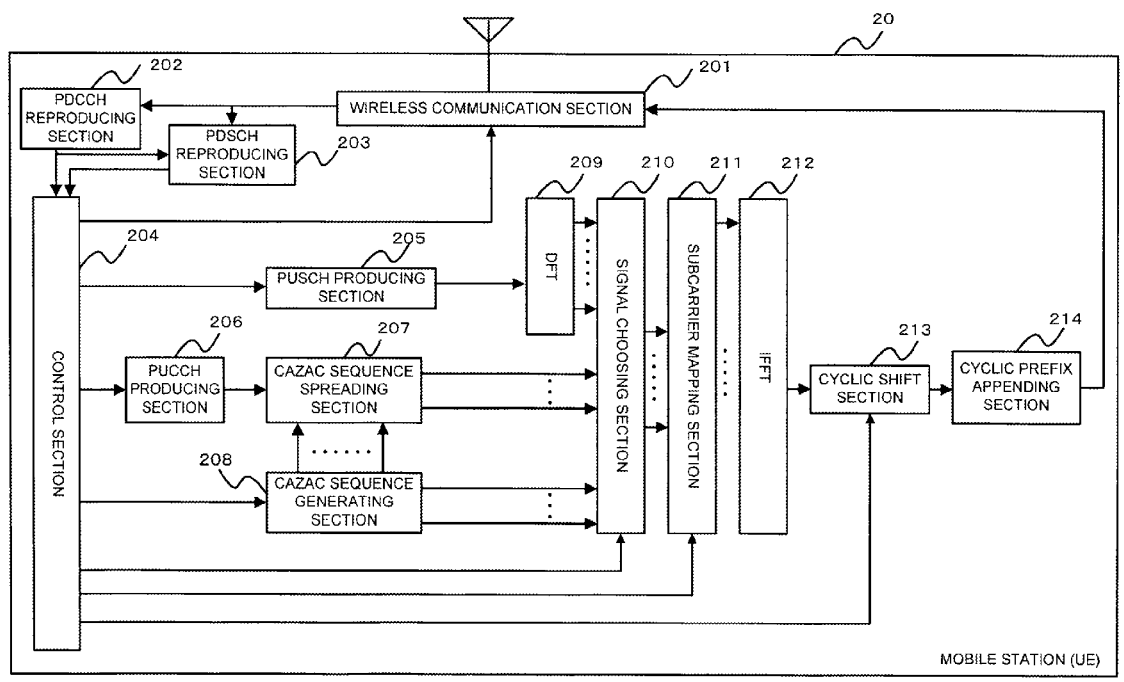
FIG. 11 is a block diagram showing a main configuration of a mobile station according to the embodiment of the present invention.

FIG. 11 is a block diagram showing a main configuration of a mobile station according to the embodiment of the present invention.

In FIG. 11, a multiplexed signal received from the base station 10 by a wireless communication section 201 is supplied to a PDCCH reproducing section 202 as input, whereupon the PDCCH reproducing section 202 reproduces a Downlink grant and an Uplink grant, and the PDSCH reproducing section 203 extracts data transmitted through the PDSCH, PUCCH allocation information for CQI reporting, etc., based on the reproduced Downlink grant. The control section 204 produces PUCCH allocation information for use in uplink control signal transmission according to the Downlink grant notified by the base station and PUCCH allocation information for CQI reporting. The operation of the control section 204 will be discussed in detail later.

A PUSCH producing section 205 generates PUSCH data signals based on the reproduced Uplink grant obtained via the control section 204, transforms the PUSCH data signals into those in the frequency domain by a discrete Fourier transform section DFT 209, and then, outputs them to the signal choosing section 210.

The PUCCH producing section 206 generates PUCCH control signals, and a CAZAC sequence spreading section 207 uses a CAZAC sequence in the frequency domain supplied from a CAZAC sequence generating section 208 to spread the PUCCH control signals.

The CAZAC sequence generating section 208 generates a CAZAC sequence in the frequency domain, and outputs it to the CAZAC sequence spreading section 207 and signal choosing section 210.

The signal choosing section 210 sequentially chooses the PUSCH data signal from the DFT 209, PUCCH control signal from the CAZAC sequence spreading section 207, and reference signal from the CAZAC sequence generating section 208, applies time division multiplexing, and outputs the resulting signal to a subcarrier mapping section 211 under control of the control section 204. The subcarrier mapping section 211 maps signals in the frequency domain supplied from the signal choosing section 210 to a subcarrier of a resource block allocated, and transforms the resulting signals into those in the time domain by an inverse Fourier transform section IFFT 212.

Subsequently, a cyclic shift section 213 applies cyclic shift to a CAZAC sequence under control of the control section 204. Specifically, for the PUSCH, the amount of the cyclic shift is set to zero and no cyclic shift is applied. For the PUCCH and reference signal, the control section 204 presents the amount of the cyclic shift in six patterns, and appends the cyclic shift to the CAZAC signal in the time domain. Subsequently, a cyclic prefix appending section 214 appends a cyclic prefix to the thus-obtained signals in the time domain and outputs the resulting signals to the wireless communication section 201.

Next, an operation of the control section 105 in the base station 10 and the control section 204 in the mobile station (UE) 20 will be described with reference to a specific example.

Figure 12:
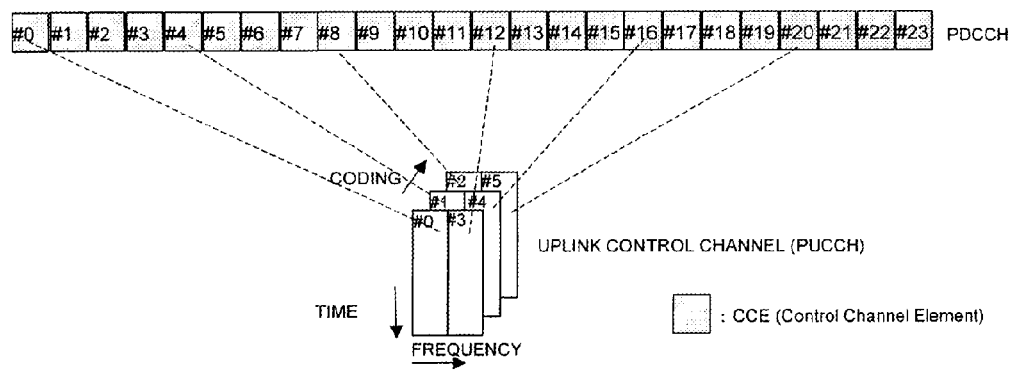
FIG. 12 is a diagram showing association between PDCCH resources and PUCCH resources in an operation of the present embodiment.

FIG. 12 is a diagram showing association between PDCCH resources and PUCCH resources in the operation of the present embodiment.

It is assumed here that the size of the DL grant varies over three types, one CCE, two CCE's, and four CCE's, and a set of four CCE's (M=4), which is the maximum size, is defined as one basic resource to associate the basic resource with an index of a PUCCH resource. It should be noted that in FIG. 12, the smallest one of indices of CCE's constituting a basic resource is defined as an index for identifying the basic resource, and the index is associated with an index of the PUCCH. However, association may be applied to indices of other CCE's or all indices constituting a basic resource without being limited to the smallest index.

Figure 13:
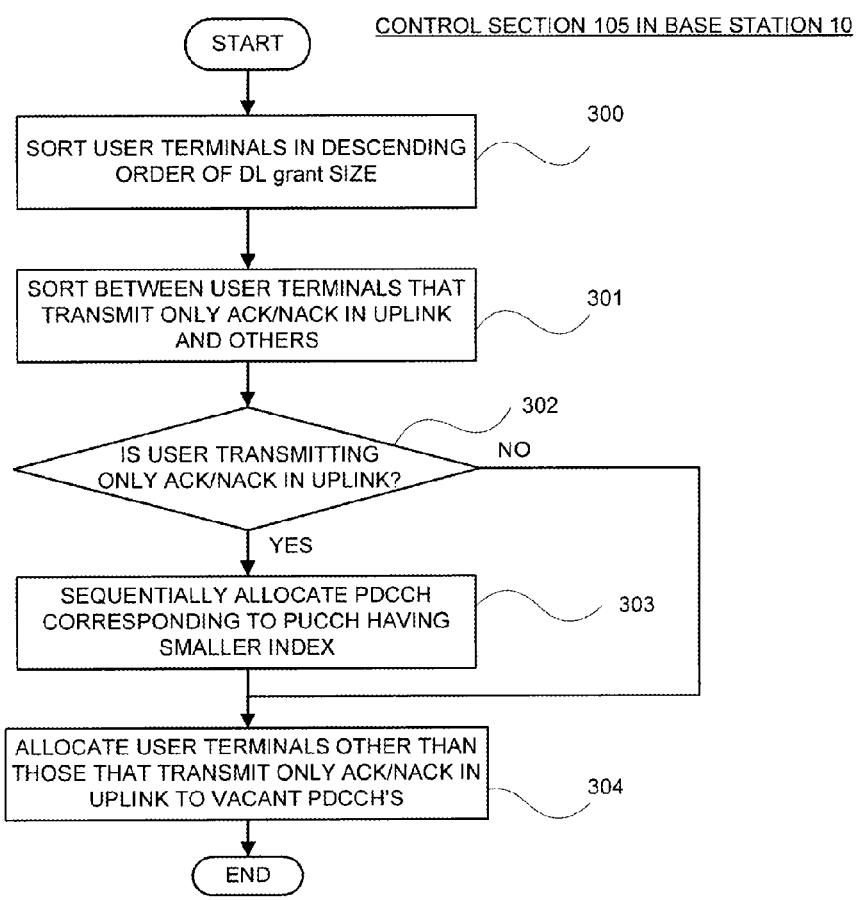
FIG. 13 is a flow chart of allocation of resources in PDCCH and PUCCH in the control section 105 of the base station 10 in the operation of the present embodiment.

FIG. 13 is a flow chart of allocation of resources in PDCCH and PUCCH at the control section 105 in the base station 10 in the operation of the present embodiment.

In FIG. 13, the control section 105 in the base station 10 first sorts DL grants for mobile stations (UE) in a descending order of the size required by a DL grant (Step 300). It then sorts the result as DL grants to the mobile stations (UE) that transmit only an ACK/NACK in response to a data signal allocated by a DL grant and others (Step 301).

Next, for each DL grant, decision is made as to whether the DL grant is for a mobile station (UE) that transmits only an ACK/NACK in response to a data signal allocated by the DL grant (Step 302).

In a case that the DL grant is for a mobile station (UE) that transmits only an ACK/NACK, the DL grant is allocated to a basic resource associated with a PUCCH resource having a smaller index in the sorted order based on association relationship information in FIG. 12 (Step 303).

After allocation of a PDCCH to a DL grant for the mobile station (UE) that transmits only an ACK/NACK has been completed, vacant resources for the PDCCH are allocated to other mobile stations (UE) (Step 304).

Figure 14:
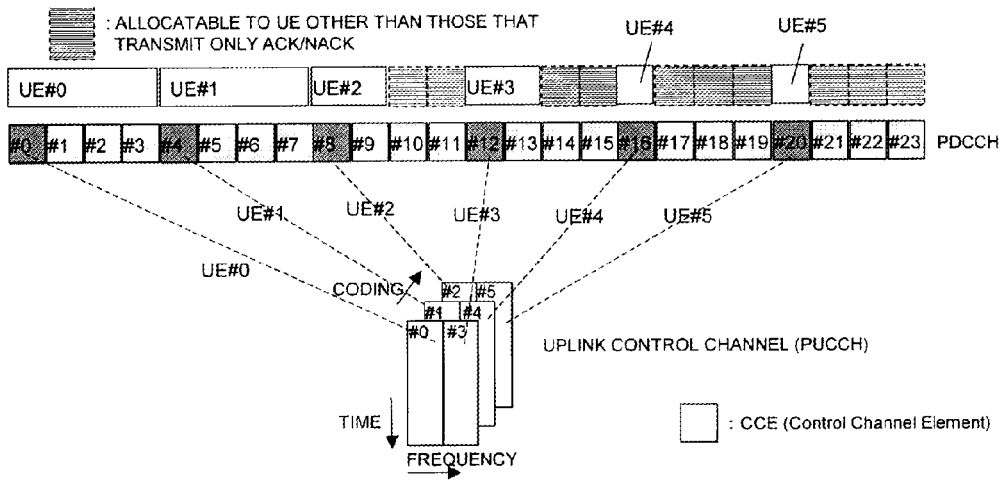
FIG. 14 shows exemplary allocation of resources in PDCCH and PUCCH when applying the association between PDCCH resources and PUCCH resources shown in FIG. 12, and flow chart of allocation of resources in PDCCH and PUCCH in FIG. 13.

FIG. 14 shows exemplary allocation of resources in PDCCH and PUCCH when applying the association between PDCCH resources and PUCCH resources shown in FIG. 12, and flow chart of allocation of resources in PDCCH and PUCCH in FIG. 13.

It is assumed here that there are six DL grants for mobile stations (UE) (UE#0-UE#5) that transmit only an ACK/NACK in an uplink, and UE#0 and UE#1 are each composed of four CCE's, UE#2 and UE#3 are each composed of two CCE's, and UE#4 and UE#5 are each composed of one CCE.

Since a set of four CCE's, which is the maximum DL grant size, is defined as a basic resource, and the smallest index of a CCE in the basic resource is associated with an index of a PUCCH resource, the PUCCH is efficiently multiplexed regardless of the size of the DL grant.

CCE's after applying multiplexing of user terminals whose DL grant is composed of two CCE' or one CCE and is not of maximum size to basic resources, for example, CCE's #10, #11, #14, #15, #17, #18, #19, #21, #22, #23, are not allocated to transmission resources for DL grants. These CCE's may be efficiently used by, for example, allocating them to user terminals that transmit upstream data along with an ACK/NACK in an uplink at the same time and transmit the upstream data and ACK/NACK through PUSCH, and user terminals that transmit a CQI along with an ACK/NACK in an uplink at the same time and transmit the CQI and ACK/NACK using a PUCCH allocated by signaling for CQI transmission.

Next, an operation of the control section 204 in the mobile station (UE) 20 will be described.

Figure 15:
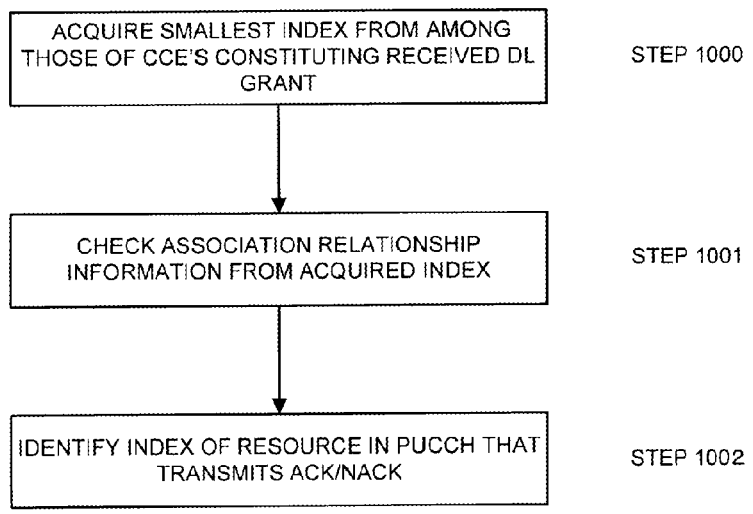
FIG. 15 is a flow chart for a control section 204 in the mobile station (UE) 20.

FIG. 15 is a flow chart for the control section 204 in the mobile station (UE) 20.

The control section 204 first acquires a CCE having the smallest index from among those constituting a received DL grant (Step 1000).

A check is made on association relationship information from the acquired indices (Step 1001), and an index of a PUCCH resource with which an ACK/NACK is transmitted is identified (Step 1002).

In particular, representing the acquired smallest index as X and the index for a PUCCH resource as Y, the control section 204 in the mobile station (UE) 20 stores information indicating that an integer part of the quotient of X/4 (M=4) is Y beforehand.

According to FIG. 14, for example, in a case that a received DL grant is UE#0, the smallest index of UE#0 is zero, the quotient of 0/4 is zero, and therefore, the index of the PUCCH resource associated with UE#0 is #0.

Likewise, in a case that a received DL grant is UE#1, the smallest index of UE#1 is four, the quotient of 4/4 is one, and therefore, the index of a PUCCH resource associated with UE#1 is #1.

Likewise, in a case that a received DL grant is UE#2, the smallest index of UE#2 is eight, the quotient of 8/4 is two, and therefore, the index of a PUCCH resource associated with UE#2 is #2.

Likewise, in a case that a received DL grant is UE#3, the smallest index of UE#3 is twelve, the quotient of 12/4 is three, and therefore, the index of a PUCCH resource associated with UE#3 is #3.

Likewise, in a case that a received DL grant is UE#4, the smallest index of UE#4 is sixteen, the quotient of 16/4 is four, and therefore, the index of a PUCCH resource associated with UE#4 is #4.

Likewise, in a case that a received DL grant is UE#5, the smallest index of UE#5 is twenty, the quotient of 20/4 is five, and therefore, the index of a PUCCH resource associated with UE#5 is #5.

In this way, the mobile station 20 can know the index of a PUCCH resource through which an ACK/NACK in response to a data signal specified by a DL grant is transmitted.

In the example above, description has been made on a case in which a basic resource is composed of four CCE's (M=4) and the number of CCE's constituting a basic resource is fixed. However, even when the basic resource is of one kind, the optimal size of a basic resource may vary with time by changing the cell configuration to thereby change the DL grant size mainly used depending upon the size of a cell, for example. In such a case, it is possible to dynamically change association between a basic resource and a PUCCH resource by notifying the size of a basic resource (the number M of CCE's constituting a basic resource) in a control signal as system information.

For example, a base station and a mobile station share association relationship information as described above (an association formula parameterized by M) to notify the mobile station of the number M of CCE's constituting a basic resource from the base station. The mobile station can know a PUCCH resource associated with a received DL grant by changing the parameter in the association relationship information (an association formula parameterized by M) to the notified value of M.

Next, another operation of the control section 105 in the base station 10 and the control section 204 in the mobile station (UE) 20 in the present embodiment will be described.

In a specific example of the present operation, it is assumed that the DL grant size varies over two types, two CCE's and four CCE's, and a set of two CCE's (M=2), which is the minimum number of the DL grant size, is defined as one basic resource to associate the basic resource with an index of a PUCCH resource. It should be noted that in FIG. 16, the smallest one of indices of CCE's constituting a basic resource is defined as an index for identifying the basic resource, and the index is associated with an index of the PUCCH. However, association may be applied to indices of other CCE's or all indices constituting a basic resource without being limited to the smallest index.

Figure 17:
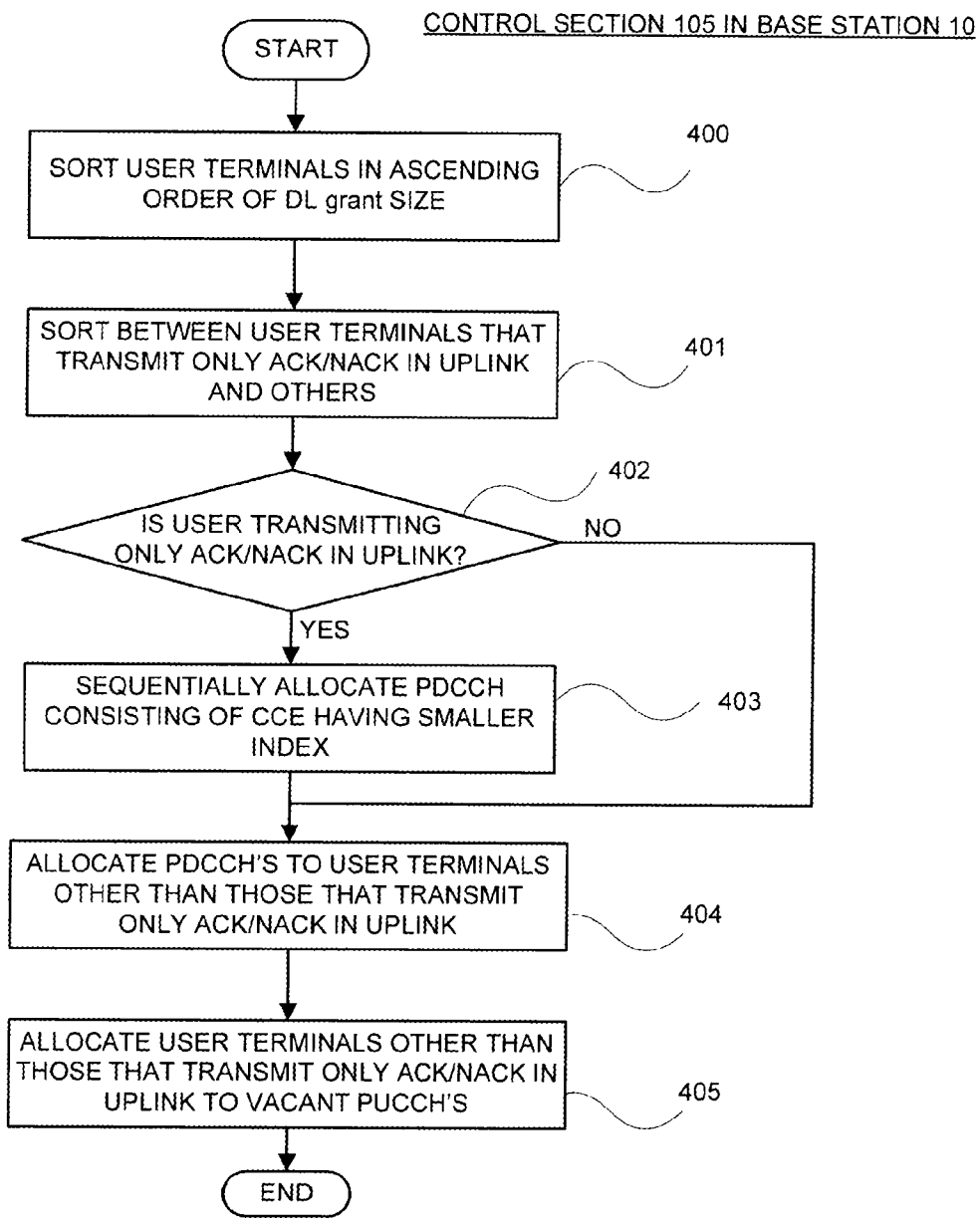
FIG. 17 is a flow chart of allocation of resources in PDCCH and PUCCH in the control section 105 in the base station 10 in another operation.

FIG. 17 is a flow chart of allocation of resources in PDCCH and PUCCH at the control section 105 in the base station 10 in another operation of the present embodiment.

In FIG. 17, the control section 105 in the base station 10 first sorts DL grants for mobile stations (UE) in an ascending order of the size required by a DL grant (Step 400). It then sorts the result as DL grants to the mobile stations (UE) that transmit only an ACK/NACK in response to a data signal allocated by a DL grant and others (Step 401).

Next, decision is made as to whether a user terminal is transmitting only an ACK/NACK in an uplink (Step 402).

Figure 16:
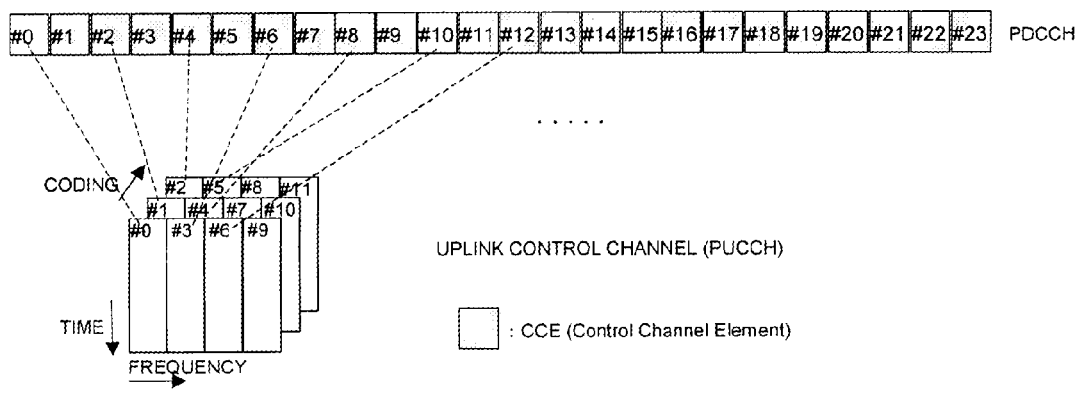
FIG. 16 is a specific example of another operation.

In a case that the DL grant is for a mobile station (UE) that transmits only an ACK/NACK, the DL grant is allocated to a basic resource associated with a PUCCH resource having a smaller index in the sorted order based on association relationship information in FIG. 16 (Step 403).

After allocation of a PDCCH to a user terminal that transmits only an ACK/NACK has been completed, PDCCH resources are allocated to other user terminals (Step 404).

Finally, vacant PUCCH resources are allocated to user terminals other than those that transmit only an ACK/NACK in an uplink (Step 405).

Figure 18:
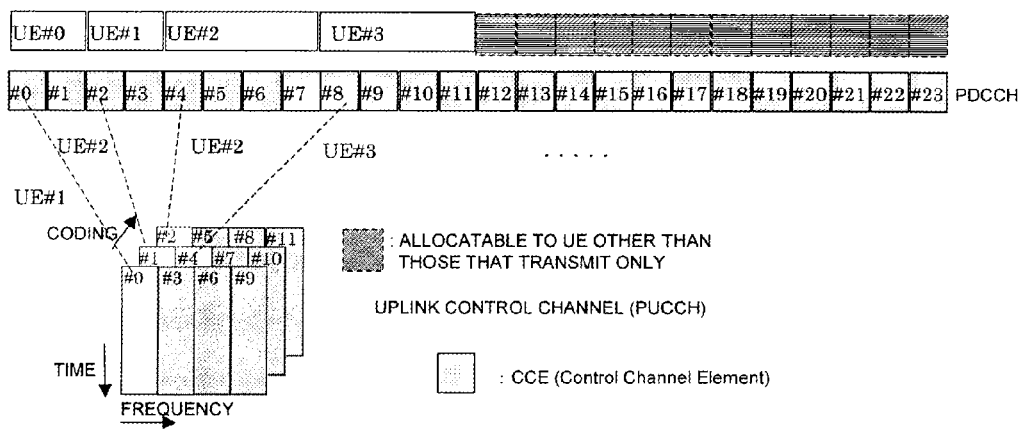
FIG. 18 shows exemplary allocation of resources in PDCCH and PUCCH when applying the association between PDCCH resources and PUCCH resources shown in FIG. 16, and flow chart of allocation of resources in PDCCH and PUCCH in FIG. 17.

FIG. 18 shows exemplary allocation of resources in PDCCH and PUCCH when applying the association between PDCCH resources and PUCCH resources shown in FIG. 16, and flow chart of allocation of resources in PDCCH and PUCCH in FIG. 17.

It is assumed here that there are four DL grants for user terminals that transmit only an ACK/NACK in an uplink (UE#0-UE#3), and UE#0 and UE#1 are each composed of four CCE's, and UE#2 and UE#3 are each composed of two CCE's.

Since the smallest index of a CCE is associated with an index of a PUCCH for the minimum DL grant size, the PDCCH is efficiently multiplexed regardless of the size of the DL grant.

Since a set of two CCE's, which is the minimum DL grant size, is defined as a basic resource, and the smallest index of a CCE in the basic resource is associated with an index of a PUCCH resource, the PUCCH is efficiently multiplexed regardless of the size of the DL grant.

Moreover, as described earlier, the CCE that is allocated with no DL grant or a PUCCH resource that is associated with no DL grant may be efficiently used by allocating them to user terminals that transmit a CQI using a PUCCH allocated by signaling for CQI transmission or to user terminals that transmit a CQI along with an ACK/NACK in an uplink at the same time and transmit the CQI and ACK/NACK using a PUCCH allocated by signaling for CQI transmission.

Next, an operation of the control section 204 in the mobile station (UE) 20 will be described; however, since the flow chart for the operation is similar to the specific example described above, detailed description will be omitted.

It should be noted that in the present operation, representing the acquired smallest index as X and the index for a PUCCH resource as Y, the control section 204 in the mobile station (UE) 20 stores information indicating that an integer part of the quotient of X/2 is Y beforehand.

According to FIG. 18, for example, in a case that a received DL grant is UE#0, the smallest index of UE#0 is zero, the quotient of 0/2 is zero, and therefore, the index of the PUCCH resource associated with UE#0 is #0.

Likewise, in a case that a received DL grant is UE#1, the smallest index of UE#1 is two, the quotient of 2/2 is one, and therefore, the index of a PUCCH resource associated with UE#1 is #1.

Likewise, in a case that a received DL grant is UE#2, the smallest index of UE#2 is four, the quotient of 4/2 is two, and therefore, the index of a PUCCH resource associated with UE#2 is #2.

Likewise, in a case that a received DL grant is UE#3, the smallest index of UE#3 is eight, the quotient of 8/2 is four, and therefore, the index of a PUCCH resource associated with UE#3 is #4.

In this way, the mobile station 20 can know the index of a PUCCH resource through which an ACK/NACK in response to a data signal specified by a DL grant is transmitted.

Subsequently, still another operation of the control section 105 in the base station 10 and the control section 204 in the mobile station (UE) 20 the present embodiment will be described.

Figure 19:
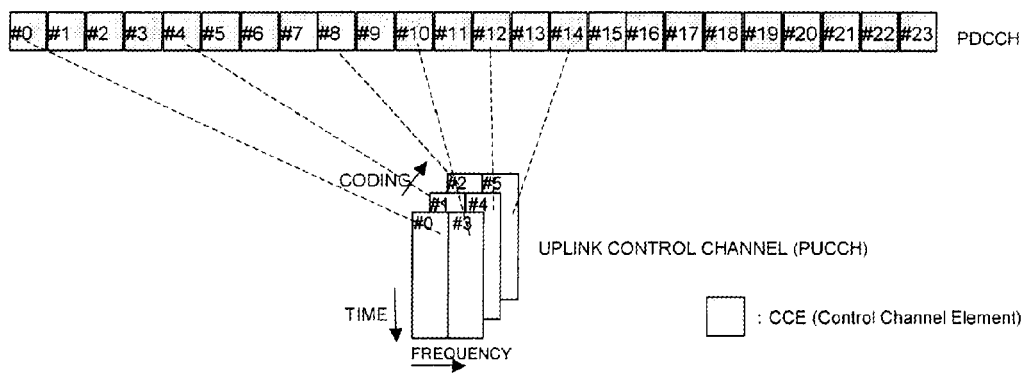
FIG. 19 is a diagram showing association between PDCCH resources and PUCCH resources in still another operation of the present embodiment.

FIG. 19 is a diagram showing association between PDCCH resources and PUCCH resources in the operation of the present embodiment. It is assumed here that the size of the DL grant varies over three types, one CCE, two CCE's, and four CCE's, and description will be made on a case in which basic resources of four CCE's (M=4) and those of two CCE's (M=2) are used, that is, a plurality of types of basic resources are used. While in the present example, the number of types of basic resources is fixed to two, it may be quasi-statically controlled depending upon the distribution of user terminals.

In FIG. 19, a basic resource composed of unit resources having index #0, index #1, index #2 and index #3 is associated with a PUCCH resource with index #0. Moreover, a basic resource composed of unit resources having index #4, index #5, index #6 and index #7 is associated with a PUCCH resource with index #1.

Furthermore, a basic resource composed of unit resources having index #8 and index #9 is associated with a PUCCH resource with index #2. A basic resource composed of unit resources having index #10 and index #11 is associated with a PUCCH resource with index #3. A basic resource composed of unit resources having index #12 and index #13 is associated with a PUCCH resource with index #4. A basic resource composed of unit resources having index #14 and index #15 is associated with a PUCCH resource with index #5.

While in the example of FIG. 19, basic resources of four CCE's (M=4) and those of two CCE's (M=2) are present in a ratio of one to two, this ratio may vary depending upon the distribution of user terminals.

Figure 20:
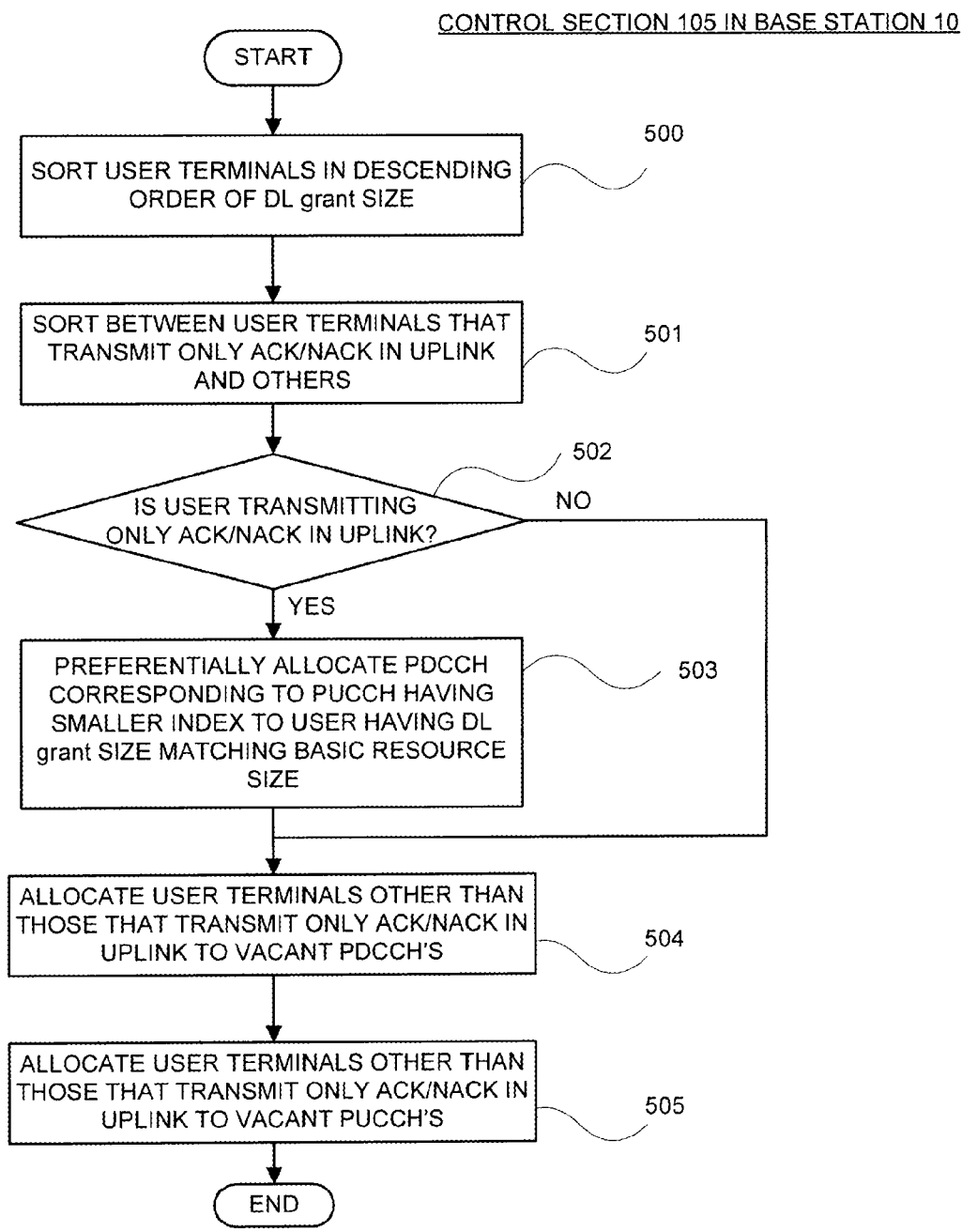
FIG. 20 is a flow chart of allocation of resources in PDCCH and PUCCH in the control section 105 in the base station 10 in still another operation of the present embodiment.

FIG. 20 is a flow chart of allocation of resources in PDCCH and PUCCH at the control section 105 in the base station 10 in the operation of the present embodiment.

In FIG. 20, the control section 105 in the base station 10 first sorts user terminals in a descending order of the DL grant size (Step 500). It then sorts the result as user terminals that transmit only an ACK/NACK in an uplink and others (Step 501). Next, decision is made as to whether a user terminal is transmitting only an ACK/NACK in an uplink (Step 502).

In a case that a user terminal is transmitting only an ACK/NACK, the DL grant is preferentially allocated for a user having the DL grant size matching a basic resource to a basic resource associated with the PUCCH having a smaller index in a sorted order (Step 503). After allocation of a PDCCH to the user terminal that transmits only an ACK/NACK has been completed, vacant resources for the PDCCH are allocated to other user terminals (Step 504). Finally, vacant PUCCH's are allocated to user terminals other than those that transmit only an ACK/NACK in an uplink (Step 505).

Figure 21:
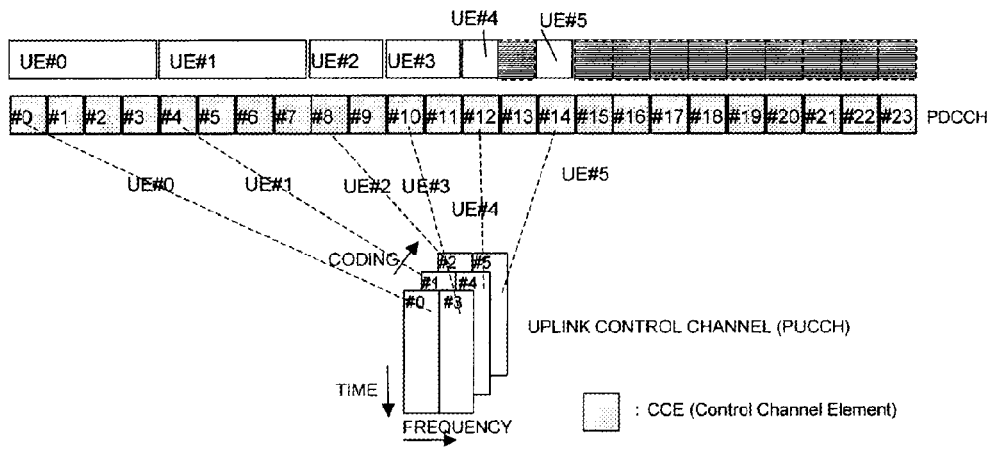
FIG. 21 shows exemplary allocation of resources in PDCCH and PUCCH when applying the association between DL grants and PUCCH resources in FIG. 19, and flow chart of allocation of resources in PDCCH and PUCCH in FIG. 20.

FIG. 21 shows exemplary allocation of resources in PDCCH and PUCCH when applying the association between DL grants and PUCCH resources shown in FIG. 19, and flow chart of allocation of resources in the PDCCH and PUCCH in FIG. 20. It is assumed here that there are six user terminals (UE#0-UE#5) that transmit only an ACK/NACK in an uplink, and UE#0 and UE#1 have DL grants each composed of four CCE's, UE#2 and UE#3 have DL grants each composed of two CCE's, and UE#4 and UE#5 have DL grants each composed of one CCE.

Since the user distribution in the DL grant size (each DL grant size has two users) assumed in the association according to FIG. 19 matches a user distribution for the DL grant size in actual scheduling, both PDCCH and PUCCH are efficiently multiplexed.

It should be noted that the CCE after being allocated with a DL grant for a user terminal having a smaller DL grant size than a basic resource (CCE#13 after UE#4, or CCE#15 after UE#5 in FIG. 21) cannot be allocated to a user that transmits only an ACK/NACK in an uplink because the DL grant and index of the PUCCH are associated with each other. These CCE's may be efficiently used by, for example, allocating them to user terminals that transmit upstream data along with an ACK/NACK in an uplink at the same time and transmit the upstream data and ACK/NACK through a PUSCH, and user terminals that transmit a CQI along with an ACK/NACK in an uplink at the same time and transmit the CQI and ACK/NACK using a PUCCH allocated by signaling for CQI transmission.

Next, an operation of the control section 204 in the mobile station (UE) 20 will be described; however, since the flow chart for the operation is similar to the specific example described above, detailed description will be omitted.

It should be noted that in the present operation, association relationship information that the control section 204 in the mobile station (UE) 20 stores is as follows:

Assuming that the size of a basic resource is four CCE's and two CCE's, the number of basic resources having four CCE's is represented as N1 and those having two CCE's as N2, and a basic resource having a larger size are disposed in sequence from the head of a PDCCH as in the association shown in FIG. 19, association between the index j (j=0, 1, 2, . . . ) for a PUCCH and the smallest index i (i=0, 1, 2, . . . ) for a CCE of a received Downlink grant is as follows:

In a case that $i<N1\times4$, $j=i/4$; or in a case that $N1\times4 \leq i < N1\times4+N2\times2$, $j=N1+(i-N1\times4)/2$.

In the present example, the number of basic resources having four CCE's is two (N1=2), and the number of those having two CCE's is four (N2=4), and therefore, the following results:

In a case that $i<2\times4=8$, $j=i/4$; or in a case that $2\times4 \leq i < 2\times4+4\times2$, i.e., $8 \leq i < 16$, $j=2+(i-2\times4)/2$ $=2+(i-8)/2$.

In this way, the mobile station 20 can know the index of a PUCCH resource through which an ACK/NACK in response to a data signal specified by a DL grant is transmitted.

It should be noted that an actually required size or number of Downlink grants varies with the traffic or movement of terminals. In an area in which such variation is relatively small, generation of unused resources can be prevented by allocating vacant CCE's or PUCCH's for other purposes as described above. As time passes, however, the specified size or number of basic resources may be drifted from the required value. In such a case, the base station may modify the size or number of basic resources and notify mobile stations of the association relationship information, thus achieving appropriate usage.

Subsequently, still another operation of the control section 105 in the base station 10 and the control section 204 in the mobile station (UE) 20 in the present embodiment will be described.

While in the example described above, the size of a basic resource is assumed to be four CCE's and two CCE's, it is not limited thereto. Particularly, a basic resource may be established according to the size of a Downlink grant to be transmitted and such a basic resource and a PUCCH resource may be associated with each other.

Figure 22:
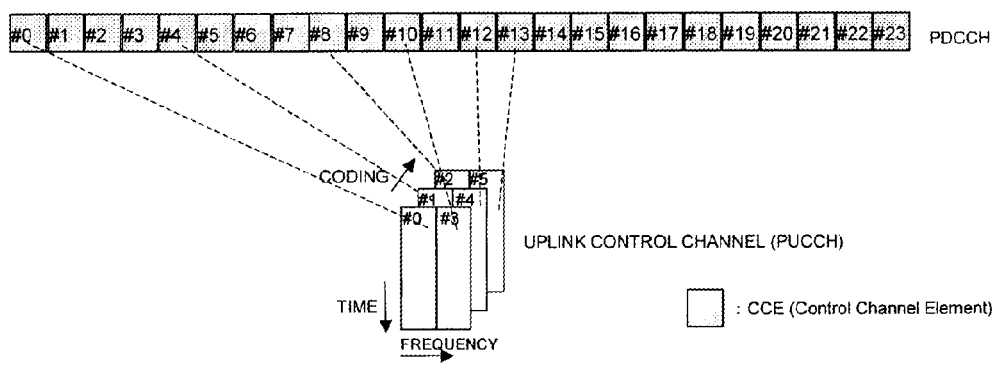
FIG. 22 is a diagram showing association between PDCCH resources and PUCCH resources in still another operation of the present embodiment.

FIG. 22 is a diagram showing association between PDCCH resources and PUCCH resources in an operation of the present embodiment. It is assumed here that the size of the DL grant varies over three types, one CCE, two CCE's, and four CCE's, and description will be made on a case in which basic resources of four CCE's (M=4), those of two CCE's (M=2), and those of one CCE (M=1) are used, that is, a plurality of types of basic resources are used. While in the present example, the number of types of basic resources is fixed to three, it may be quasi-statically controlled depending upon the distribution of user terminals.

In FIG. 22, a basic resource composed of unit resources having index #0, index #1, index #2 and index #3 is associated with a PUCCH resource with index #0. Moreover, a basic resource composed of unit resources having index #4, index #5, index #6 and index #7 is associated with a PUCCH resource with index #1.

Furthermore, a basic resource composed of unit resources (CCE's) having index #8 and index #9 is associated with a PUCCH resource with index #2. A basic resource composed of unit resources (CCE's) having index #10 and index #11 is associated with a PUCCH resource with index #3. A basic resource composed of unit resources (CCE's) having index #12 is associated with a PUCCH resource with index #4. A basic resource composed of unit resources (CCE's) having index #13 is associated with a PUCCH resource with index #5.

While in the example of FIG. 22, basic resources of four CCE's, those of two CCE's and those of one CCE are present in a ratio of one to one to one, this ratio may be changed depending upon the distribution of user terminals.

The operation of the control section 105 in the base station 10 and the control section 204 in the mobile station (UE) 20 in the present embodiment is similar to that described above.

Figure 23:
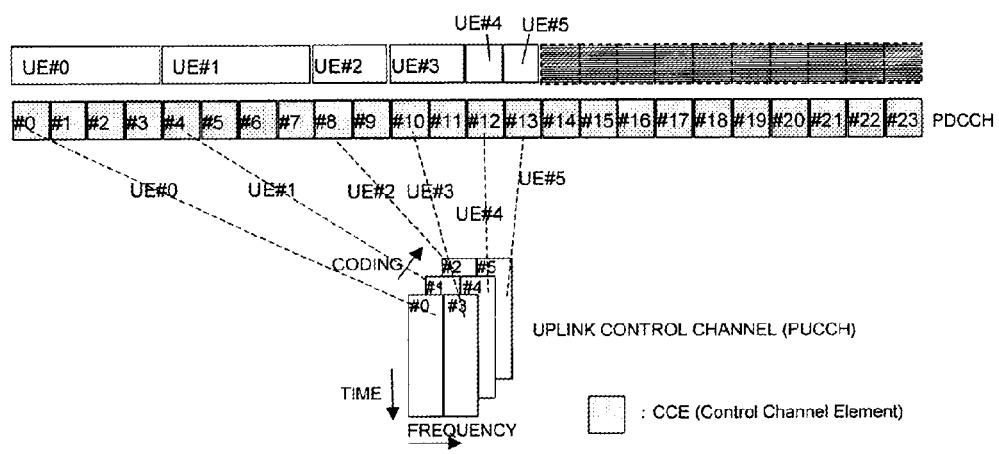
FIG. 23 shows exemplary allocation of resources in PDCCH and PUCCH when applying the association between DL grants and a PUCCH in FIG. 22.

FIG. 23 shows exemplary allocation of resources in PDCCH and PUCCH when applying the association between DL grants and a PUCCH in FIG. 22. It is assumed here that there are six user terminals (UE#0-UE#5) that transmit only an ACK/NACK in an uplink, and UE#0 and UE#1 have DL grants each composed of four CCE's, UE#2 and UE#3 have DL grants each composed of two CCE's, and UE#4 and UE#5 have DL grants each composed of one CCE.

Since the user distribution in the DL grant size (each DL grant size is for two users) assumed in the association according to FIG. 23 matches a DL grant size and a user distribution in the DL grant size in actual scheduling, both PDCCH and PUCCH are efficiently multiplexed.

As for identification of an index of a PUCCH resource associated with a received DL grant by a mobile station, association relationship information as described above may be shared with the base station, and the index of a PUCCH resource can be known.

Several portions in the mobile stations and base stations in the embodiments described above may be implemented by an information processing apparatus operated by programs.

Several embodiments have been described above, and the embodiments of the present invention are as follows:

The 1st embodiment of the present invention is characterized in that a communication system in comprising: a base station having a resource allocating means for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information, and a first control information transmitting means for transmitting said allocated first control information to a mobile station; and a mobile station having a second control information transmitting means for receiving said first control information, and transmitting said second control information using the resource in the second control channel associated with said first control information.

In addition, the 2nd embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 3rd embodiment of the present invention is characterized in that said resource allocating means defines a maximum one of the numbers of unit resources for use in transmitting the first control information as M.

In addition, the 4th embodiment of the present invention is characterized in that said resource allocating means defines a minimum one of the numbers of unit resources for use in transmitting the first control information as M.

In addition, the 5th embodiment of the present invention is characterized in that said resource allocating means regularly modifies M depending upon the number of unit resources for use in transmitting the first control information.

In addition, the 6th embodiment of the present invention is characterized in that said resource allocating means preferentially allocates a mobile station that transmits the second control information using the second control channel, to the first control channel.

In addition, the 7th embodiment of the present invention is characterized in that said resource allocating means preferentially allocates a mobile station for which the number of unit resources for use in transmitting said first control information is M among those receiving the first control information, to the first control channel.

In addition, the 8th embodiment of the present invention is characterized in that said resource allocating means allocates a unit resource in the first control channel that is not used in transmitting said first control information, to a mobile station that does not use a resource in said second control channel associated with said first control information.

In addition, the 9th embodiment of the present invention is characterized in that said resource allocating means allocates a resource in the second control channel that is not associated with said first control information, to a mobile station that does not use a resource in said second control channel associated with said first control information.

In addition, the 10th embodiment of the present invention is characterized in that said base station and said mobile station have association relationship information on the association relationship between identification information for said basic resource or unit resources constituting said basic resource and identification information for a resource in said second control channel; the resource allocating means in said base station associates said first control information with a resource in said second control channel based on said association relationship information; and the second control information transmitting means in said mobile station decides a resource in the second control channel associated with received first control information based on the identification information for the basic resource or unit resources constituting said basic resource used in transmitting said received first control information, and said association relationship information.

In addition, the 11th embodiment of the present invention is characterized in that a base station comprising: a resource allocating means for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information; and a first control information transmitting means for transmitting said allocated first control information to said mobile station.

In addition, the 12th embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 13th embodiment of the present invention is characterized in that said resource allocating means defines a maximum one of the numbers of unit resources for use in transmitting the first control information as M.

In addition, the 14th embodiment of the present invention is characterized in that said resource allocating means defines a minimum one of the numbers of unit resources for use in transmitting the first control information as M.

In addition, the 15th embodiment of the present invention is characterized in that said resource allocating means regularly modifies M depending upon the number of unit resources for use in transmitting the first control information.

In addition, the 16th embodiment of the present invention is characterized in that said resource allocating means preferentially allocates a mobile station that transmits the second control information using the second control channel, to the first control channel.

In addition, the 17th embodiment of the present invention is characterized in that said resource allocating means preferentially allocates a mobile station for which the number of unit resources for use in transmitting said first control information is M among those receiving the first control information, to the first control channel.

In addition, the 18th embodiment of the present invention is characterized in that said resource allocating means allocates a unit resource in the first control channel that is not used in transmitting said first control information, to a mobile station that does not use a resource in said second control channel associated with said first control information.

In addition, the 19th embodiment of the present invention is characterized in that said resource allocating means allocates a resource in the second control channel that is not associated with said first control information, to a mobile station that does not use a resource in said second control channel associated with said first control information.

In addition, the 20th embodiment of the present invention is characterized in that said base station has association relationship information on the association relationship between identification information for said basic resource or unit resources constituting said basic resource, and identification information for a resource in said second control channel; and said resource allocating means associates said first control information with a resource in said second control channel based on said association relationship information.

The 21st embodiment of the present invention is characterized in that a mobile station for receiving first control information, for which M unit resources (M is an integer equal to or greater than two) in a first control channel through which the first control information is transmitted from a base station are defined as a basic resource, and in which a resource in a second control channel through which second control information is transmitted is associated with said basic resource, said first control information being transmitted using at least part of said basic resource, and transmitting second control information using a resource in the second control channel associated with received first control information, said mobile station comprising: association relationship information that is information on the association relationship between said basic resource or unit resources constituting said basic resource and a resource in the second control channel through which the second control information is transmitted; and a control information transmitting means for deciding a resource in the second control channel associated with said received first control information based on the information for the basic resource for said received first control information or unit resources constituting said basic resource, and said association relationship information.

In addition, the 22nd embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 23rd embodiment of the present invention is characterized in that said M is a maximum one of the numbers of unit resources for use in transmitting the first control information.

In addition, the 24th embodiment of the present invention is characterized in that said M is a minimum one of the numbers of unit resources for use in transmitting the first control information.

In addition, the 25th embodiment of the present invention is characterized in that said M regularly varies depending upon the number of unit resources for use in transmitting the first control information.

The 26th embodiment of the present invention is characterized in that a program for causing a base station to execute: resource allocating processing for defining M unit resources (M is an integer equal to or greater than two) in a first control channel through which first control information is transmitted as a basic resource, associating a resource in a second control channel through which second control information is transmitted with said basic resource, allocating at least part of said basic resource to said first control information, and associating the first control information to which at least part of said basic resource is allocated with a resource in the second control channel associated with one of the basic resources allocated to said first control information; and first control information transmitting processing for transmitting said allocated first control information to said mobile station.

In addition, the 27th embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 28th embodiment of the present invention is characterized in that said resource allocating processing defines a maximum one of the numbers of unit resources for use in transmitting the first control information as M.

In addition, the 29th embodiment of the present invention is characterized in that said resource allocating processing defines a minimum one of the numbers of unit resources for use in transmitting the first control information as M.

In addition, the 30th embodiment of the present invention is characterized in that said resource allocating processing regularly modifies M depending upon the number of unit resources for use in transmitting the first control information.

In addition, the 31st embodiment of the present invention is characterized in that said resource allocating processing associates said first control information with the resource in said second control channel based on association relationship information on the association relationship between identification information for said basic resource or unit resources constituting said basic resource and identification information for a resource in said second control channel.

The 32nd embodiment of the present invention is characterized in that a program for a mobile station for receiving first control information, for which M unit resources (M is an integer equal to or greater than two) in a first control channel through which the first control information is transmitted from a base station are defined as a basic resource, and in which a resource in a second control channel through which second control information is transmitted is associated with said basic resource, said first control information being transmitted using at least part of said basic resource, and transmitting second control information using a resource in the second control channel associated with received first control information, said program causing said mobile station to execute: control information transmitting processing for deciding a resource in the second control channel associated with said received first control information based on association relationship information that is information on the association relationship between said basic resource or unit resources constituting said basic resource and a resource in the second control channel through which the second control information is transmitted, and the information for the basic resource for said received first control information or unit resources constituting said basic resource.

In addition, the 33rd embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 34th embodiment of the present invention is characterized in that said M is a maximum one of the numbers of unit resources for use in transmitting the first control information.

In addition, the 35th embodiment of the present invention is characterized in that said M is a minimum one of the numbers of unit resources for use in transmitting the first control information.

In addition, the 36th embodiment of the present invention is characterized in that said M regularly varies depending upon the number of unit resources for use in transmitting the first control information.

In addition, the 37th embodiment of the present invention is characterized in that a communication method wherein: a first wireless station transmits first control information to a second wireless station using at least one unit resource in a first control channel; and a second wireless station transmits second control information using a resource in a second control channel associated with a resource consisting of M unit resources (M is an integer equal to or greater than two) in said first control channel.

In addition, the 38th embodiment of the present invention is characterized in that said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

In addition, the 39th embodiment of the present invention is characterized in that said M is a maximum one of the numbers of unit resources for use in transmitting the first control information.

In addition, the 40th embodiment of the present invention is characterized in that said M is a minimum one of the numbers of unit resources for use in transmitting the first control information.

In addition, the 41st embodiment of the present invention is characterized in that said M is regularly modified depending upon the number of unit resources for use in transmitting the first control information.

In addition, the 42nd embodiment of the present invention is characterized in that said first wireless station and said second wireless station have association relationship information on the association relationship between identification information for a resource in the first control channel and a resource in the second control channel; said first wireless station allocates a resource in the second control channel to said second wireless station based on said association relationship information; and said second wireless station decides a resource in the second control channel allocated by said first wireless station based on the identification information for the resource used in transmitting said first control information, and said association relationship information.

The 43rd embodiment of the present invention is characterized in that a communication method for a communication system comprising a mobile station and a base station, wherein the base station defines M unit resources (M is an integer equal to or greater than two) in a first control channel through which first control information is transmitted as a basic resource, associates a resource in a second control channel through which second control information is transmitted from the mobile station with said basic resource, allocates at least part of said basic resource to said first control information, and associates the first control information to which at least part of said basic resource is allocated with a resource in the second control channel associated with one of the basic resources allocated to said first control information.

The 44th embodiment of the present invention is characterized in that a communication method in a communication system comprising a mobile station and a base station, in which M unit resources (M is an integer equal to or greater than two) in a first control channel through which first control information is transmitted from said base station are defined as a basic resource, and in which a resource in a second control channel through which second control information is transmitted is associated with said basic resource for receiving first control information transmitted using at least part of said basic resource, and transmitting, by the mobile station, second control information using a resource in the second control channel associated with the received first control information, wherein: the mobile station decides a resource in the second control channel associated with said received first control information based on association relationship information that is information on the association relationship between said basic resource or unit resources constituting said basic resource and a resource in the second control channel through which the second control information is transmitted, and the information for the basic resource for the received first control information or unit resources constituting said basic resource.

The 45th embodiment of the present invention is characterized in that a communication system comprising: a base station having a resource allocating means for providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information, and a first control information transmitting means for transmitting said allocated first control information to said mobile station; and a mobile station having a second control information transmitting means for receiving said first control information, and transmitting said second control information using the resource in the second control channel associated with said first control information.

The 46th embodiment of the present invention is characterized in that a base station comprising: a resource allocating means for providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information; and a first control information transmitting means for transmitting said allocated first control information to said mobile station.

The 47th embodiment of the present invention is characterized in that a mobile station for receiving first control information for which a plurality of basic resources corresponding to a plurality of kinds of sizes of first control information are provided, and in which a resource in a second control channel through which second control information is transmitted is associated with each basic resource, said first control information being transmitted from a base station using at least part of said basic resource, and transmitting second control information using a resource in the second control channel associated with the received first control information, said mobile station comprising: association relationship information that is information on the association relationship between said basic resource and a resource in the second control channel through which the second control information is transmitted; and a control information transmitting means for deciding a resource in the second control channel associated with said received first control information based on the information for the basic resource for said received first control information, and said association relationship information.

The 48th embodiment of the present invention is characterized in that a communication method in a communication system comprising a base station and a mobile station, wherein: the base station provides a plurality of basic resources corresponding to a plurality of kinds of sizes of first control information, associates a resource in a second control channel through which second control information is transmitted with each basic resource, allocates at least part of said basic resource to said first control information, and associates the first control information to which at least part of said basic resource is allocated with a resource in the second control channel associated with one of the basic resources allocated to said first control information, and transmits said allocated first control information to said mobile station; and the mobile station receives said first control information, and transmits said second control information using the resource in the second control channel associated with said first control information.

The 49th embodiment of the present invention is characterized in that a communication method for a base station in a communication system comprising a base station and a mobile station, comprising: providing a plurality of basic resources corresponding to a plurality of kinds of sizes of first control information, associating a resource in a second control channel through which second control information is transmitted with each basic resource, allocating at least part of said basic resource to said first control information, and associating the first control information to which at least part of said basic resource is allocated with a resource in the second control channel associated with one of the basic resources allocated to said first control information; and transmitting said allocated first control information to said mobile station.

The 50th embodiment of the present invention is characterized in that a communication method for a mobile station for receiving first control information for which a plurality of basic resources corresponding to a plurality of kinds of sizes of first control information are provided, and in which a resource in a second control channel through which second control information is transmitted is associated with each basic resource, said first control information being transmitted from a base station using at least part of said basic resource, and transmitting second control information using a resource in the second control channel associated with the received first control information, said method comprising: deciding a resource in the second control channel associated with said received first control information based on association relationship information that is information on the association relationship between said basic resource and a resource in the second control channel through which the second control information is transmitted, and the information for said basic resource for said received first control information.

Above, while the present invention has been described with respect to the preferred embodiments and examples, the present invention is not always limited to the above-mentioned embodiment and examples, and alterations to, variations of, and equivalent to these embodiments and the examples can be implemented without departing from the spirit and scope of the present invention.

This application is based upon and claims the benefit of priority from Japanese patent application No. 2007-209739, filed on Aug. 10, 2007, the disclosure of which is incorporated herein in its entirety by reference.

The invention claimed is:

1. A communication system, comprising:
a mobile station; and
a base station comprising
a resource allocator that allocates first control information to be transmitted to the mobile station to a unit resource in a first control channel for a basic resource unit, where M unit resources, M being an integer equal to or greater than two, in the first control channel through which the base station transmits the first control information to the mobile station, are defined as a basic resource, the basic resource being a unit for associating the first control information with a resource in a second control channel through which the mobile station transmits second control information to the base station, and a first control information transmitter that transmits said allocated first control information to the mobile station, wherein information on an association relationship between the first control information and an index of the resource in the second control channel is shared between the base station and the mobile station in advance, the information on the association relationship being obtained based on an index of the unit resource to which the first control information has been allocated and the number of M unit resources constituting the basic resource, the mobile station comprising a second control information transmitter that receives said first control information, obtains the index of the resource in the second control channel associated with the first control information from the information on the association relationship shared in advance, obtains the index of the unit resource to which the received first control information has been allocated, and transmits said second control information using the resource with the obtained index in the second control channel.

2. The communication system according to claim 1, wherein said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

3. The communication system according to claim 1, wherein said resource allocator defines a maximum one of the numbers of unit resources for use in transmitting the first control information as M.

4. The communication system according to claim 1, wherein said resource allocator preferentially allocates a mobile station that transmits the second control information using the second control channel, to the first control channel.

5. The communication system according to claim 1, wherein said resource allocator preferentially allocates a mobile station for which the number of unit resources for use in transmitting said first control information is M among those receiving the first control information, to the first control channel.

6. The communication system according to claim 1, wherein said resource allocator allocates a unit resource in the first control channel that is not used in transmitting said first control information, to a mobile station that does not use a resource in said second control channel associated with said first control information.

7. The communication system according to claim 1, wherein said resource allocator allocates a resource in the second control channel that is not associated with said first control information, to a mobile station that does not use a resource in said second control channel associated with said first control information.

8. A base station in a communication system including a mobile station and the base station, where M unit resources, M being an integer equal to or greater than two, in a first control channel through which the base station transmits first control information to the mobile station is defined as a basic resource, the basic resource being a unit for associating the first control information with a resource in a second control channel through which the mobile station transmits second control information to the base station, the base station comprising:

one or more processors sharing with the mobile station in advance information on an association relationship between the first control information and an index of the resource in the second control channel, the information on the association relationship being obtained based on an index of the unit resource to which the first control information has been allocated and the number of M unit resources constituting the basic resource;

a resource allocator that allocates the first control information to be transmitted to the mobile station to the unit resource in the first control channel for the basic resource unit; and a first control information transmitter that transmits said allocated first control information to the mobile station.

9. The base station according to claim 8, wherein said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

10. The base station according to claim 8, wherein said resource allocator defines a maximum one of the numbers of unit resources for use in transmitting the first control information as M.

11. The base station according to claim 8, wherein said resource allocator preferentially allocates a mobile station that transmits the second control information using the second control channel, to the first control channel.

12. The base station according to claim 8, wherein said resource allocator preferentially allocates a mobile station for which the number of unit resources for use in transmitting said first control information is M among those receiving the first control information, to the first control channel.

13. The base station according to claim 8, wherein said resource allocator allocates a unit resource in the first control channel that is not used in transmitting said first control information, to a mobile station that does not use a resource in said second control channel associated with said first control information.

14. The base station according to claim 8, wherein said resource allocator allocates a resource in the second control channel that is not associated with said first control information, to a mobile station that does not use a resource in said second control channel associated with said first control information.

15. A mobile station in a communication system including a base station and the mobile station, where M unit resources, M being an integer equal to or greater than two, in a first control channel through which the base station transmits first control information to the mobile station are defined as a basic resource, the basic resource being a unit for associating the first control information with a resource in a second control channel through which the mobile station transmits second control information to the base station said mobile station comprising:

one or more processors configured to share with the base station in advance information on an association relationship between said first control information and an index of the resource in the second control channel, the information on the association relationship being obtained based on an index of the unit resource to which the first control information has been allocated and the number of M unit resources constituting the basic resource; and a control information transmitter that receives the first control information, obtains an index of the resource in the second control channel associated with said first control information from the information on the association relationship shared in advance, obtains the index of the unit resource to which the received first control information has been allocated, and transmits the second control information using the resource with the obtained index in the second control channel.

16. The mobile station according to claim 15, wherein said first control channel is a PDCCH (Physical Downlink Control Channel), the unit resource in said first control channel is a CCE (Control Channel Element), said first control information is a Downlink grant, said second control channel is a PUCCH (Physical Uplink Control Channel), and said second control information is an ACK (Acknowledgement) or NACK (Negative Acknowledgement).

17. The mobile station according to claim 15, wherein said M is a maximum one of the numbers of unit resources for use in transmitting the first control information.

* * * * *